US011953617B2

United States Patent
Teague et al.

(10) Patent No.: US 11,953,617 B2
(45) Date of Patent: Apr. 9, 2024

(54) MULTI-PANEL MULTI-FUNCTION AESA SYSTEM

(71) Applicant: Rockwell Collins, Inc., Cedar Rapids, IA (US)

(72) Inventors: Jacob G. Teague, West Melbourne, FL (US); Venkata A. Sishtla, Cedar Rapids, IA (US); Jiwon L Moran, Marion, IA (US); James B. West, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 402 days.

(21) Appl. No.: 17/212,120

(22) Filed: Mar. 25, 2021

(65) Prior Publication Data

US 2022/0308165 A1 Sep. 29, 2022

Related U.S. Application Data

(63) Continuation-in-part of application No. 17/211,266, filed on Mar. 24, 2021, now Pat. No. 11,835,648.

(51) Int. Cl.
*G01S 7/41* (2006.01)
*G01S 7/03* (2006.01)
(Continued)

(52) U.S. Cl.
CPC .............. *G01S 7/414* (2013.01); *G01S 7/03* (2013.01); *G01S 13/426* (2013.01);
(Continued)

(58) Field of Classification Search
None
See application file for complete search history.

(56) References Cited

U.S. PATENT DOCUMENTS

| 4,246,585 A | 1/1981 | Mailloux |
| 7,423,578 B1 | 9/2008 | Tietjen |

(Continued)

FOREIGN PATENT DOCUMENTS

| CN | 103487798 A | 1/2014 |
| EP | 0808463 B1 | 5/2000 |

(Continued)

OTHER PUBLICATIONS

David Lynch et al: "Multifunctional radar systems for fighter aircraft" In: "Radar Handbook, Third Edition", Feb. 17, 2008 (Feb. 17, 2008), McGraw-Hill, XP055598995, ISBN: 978-0-07-158942-0.

(Continued)

*Primary Examiner* — Bernarr E Gregory
(74) *Attorney, Agent, or Firm* — Suiter Swantz pc llo

(57) ABSTRACT

A system and method for a multi-panel multi-function active electronically scanned array (AESA) radar operation receives radar commands from individual aircraft systems and segments a plurality of AESA panels fixed (at variable azimuth/elevation about the aircraft) into a plurality of subarrays to carry out each individual function commanded by the individual aircraft system. Dependent on aircraft status and phase of flight, the and individual AESA are designated for use and the subarrays are sized based on desired radar function at the specific phase of flight and specific threat associated with the phase. The system dynamically shifts the designated AESA, subarray size, beam characteristics, power settings, and function to enable multiple simultaneous function of the suite of AESA panels.

15 Claims, 20 Drawing Sheets

(51) Int. Cl.
  *G01S 13/42* (2006.01)
  *G01S 13/933* (2020.01)
  *H01Q 1/28* (2006.01)
  *G01S 13/02* (2006.01)
  *H01Q 21/00* (2006.01)

(52) U.S. Cl.
  CPC .......... *G01S 13/933* (2020.01); *H01Q 1/286* (2013.01); *G01S 2013/0254* (2013.01); *H01Q 21/00* (2013.01)

(56) References Cited

U.S. PATENT DOCUMENTS

| | | | |
|---|---|---|---|
| 7,737,879 | B2 | 6/2010 | Tietjen et al. |
| 7,786,948 | B2 | 8/2010 | Webb et al. |
| 8,952,843 | B1 | 2/2015 | West et al. |
| 9,041,587 | B2 | 5/2015 | Longstaff |
| 9,116,244 | B1 | 8/2015 | West et al. |
| 9,419,329 | B1 | 8/2016 | West et al. |
| 9,478,858 | B1 | 10/2016 | West et al. |
| 9,568,590 | B1 | 2/2017 | Haupt et al. |
| 9,680,234 | B2 | 6/2017 | Love et al. |
| 10,050,336 | B2 | 8/2018 | Wang et al. |
| 11,630,203 | B2 | 4/2023 | Dubois et al. |
| 2005/0046607 | A1 | 3/2005 | Volman |
| 2010/0060517 | A1 | 3/2010 | Nichols et al. |
| 2010/0066631 | A1* | 3/2010 | Puzella ................ H01Q 21/00 29/601 |
| 2013/0214972 | A1 | 8/2013 | Woodell et al. |
| 2017/0045613 | A1 | 2/2017 | Wang |
| 2017/0084183 | A1 | 3/2017 | Knox |
| 2018/0259641 | A1 | 9/2018 | Vacanti |
| 2019/0035291 | A1 | 1/2019 | Saxena et al. |
| 2019/0113610 | A1 | 4/2019 | Vacanti et al. |
| 2020/0271777 | A1 | 8/2020 | Vacanti et al. |

FOREIGN PATENT DOCUMENTS

| | | | |
|---|---|---|---|
| EP | 3470875 | A1 | 4/2019 |
| GB | 2504252 | B | 7/2014 |

OTHER PUBLICATIONS

Extended Search Report in European Application No. 22163310.0 dated Aug. 8, 2022, 9 pages.

Extended Search Report in European Application No. 22163311.8 dated Aug. 11, 2022, 8 pages.

Moo Peter W et al: "Overview of Naval Multifunction RF Systems", 2018 15th European Radar Conference (EURAD), European Microwave Association,Sep. 26, 2018 (Sep. 26, 2018), pp. 178-181, XP033453383, DOI: 10.23919/EURAD.2018.8546521.

Wang Yue and Cao Lanying, "Status in U.S. AESA fighter radar and development trends," IET International Radar Conference 2013, Xi'an, 2013, pp. 1-6, doi: 10.1049/cp.2013.0229. (Year: 2013).

C. Kopp, "Active Electronically Steered Arrays: A Maturing Technology"; posted on the internet at ausairpower.net; copyright 2014.

* cited by examiner

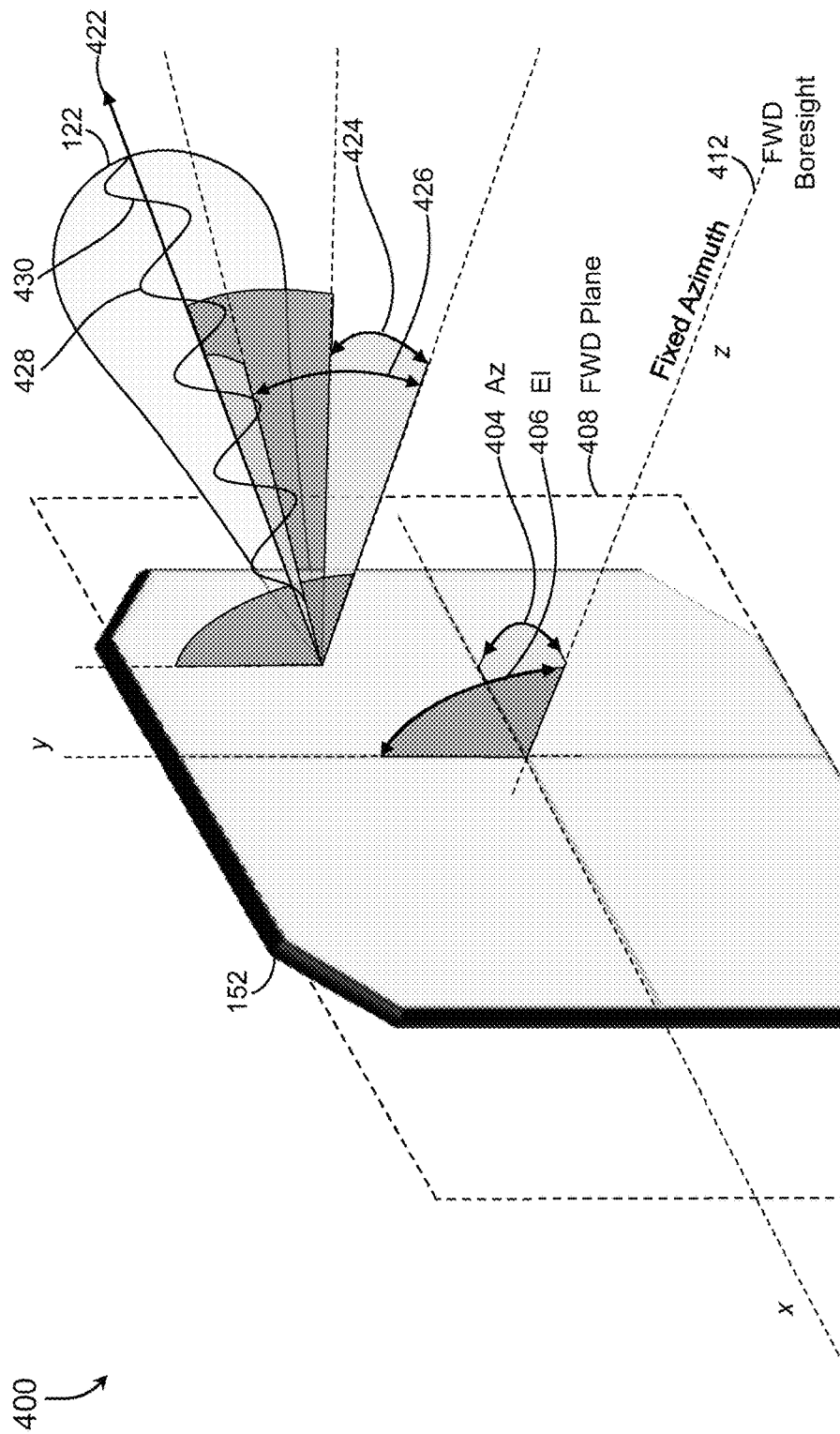

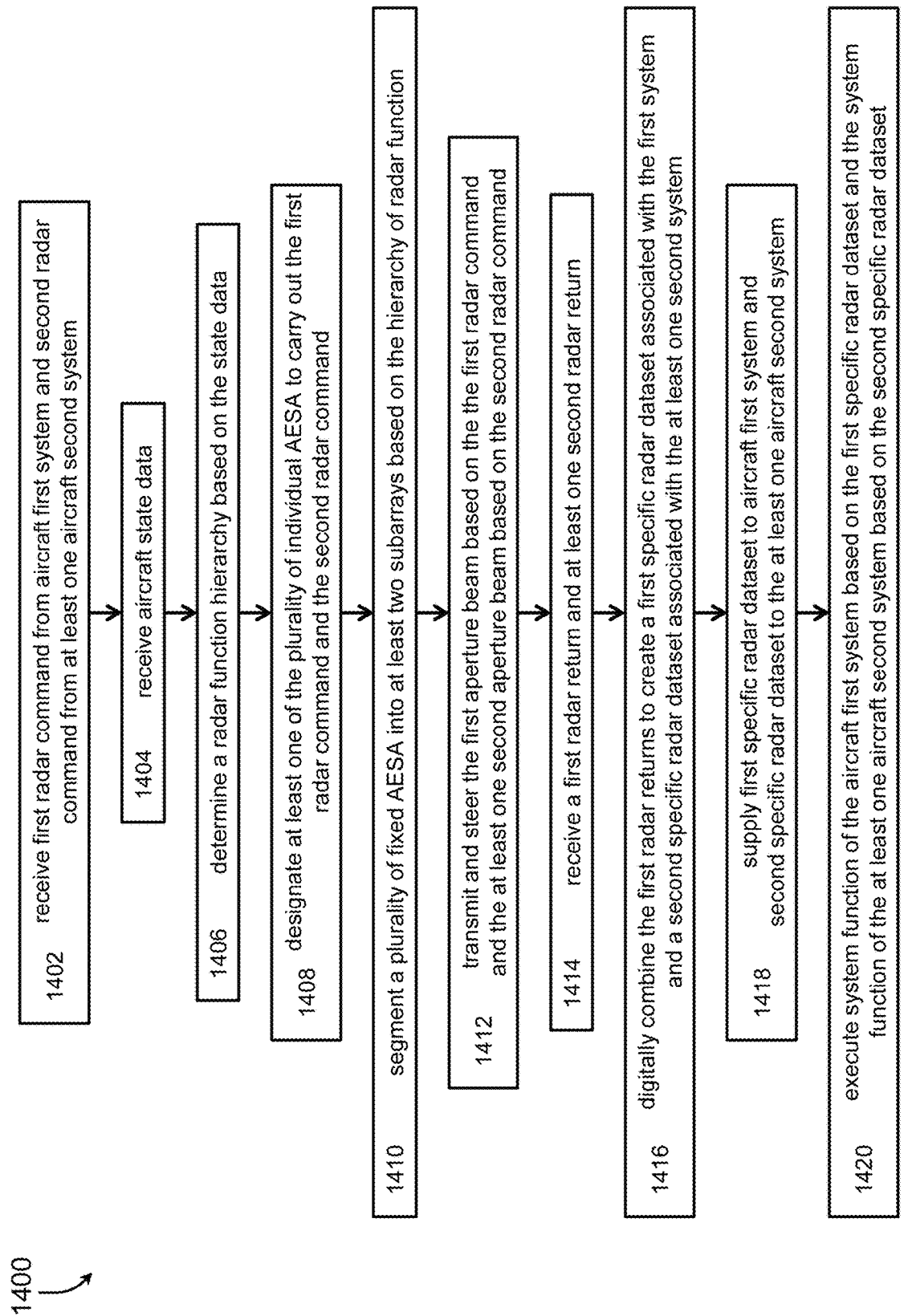

MULTI-PANEL MULTI-FUNCTION AESA SYSTEM

CROSS-REFERENCE TO RELATED APPLICATIONS

The present application is a continuation-in-part of and claims the benefit under 35 U.S.C. § 119 and/or 120 of U.S. patent application Ser. No. 17/211,266 entitled "Multi-Beam Multi-Function AESA" filed 24 March, 2021, now U.S. Pat. No. 11,835,645. The present application is also related to the following U.S. Patent Applications: U.S. patent application Ser. No. 17/023,774 entitled "Agile Antenna Taper Based on Weather Radar Feedback filed 17 September, 2020, now U.S. Pat. No. 11,754,706; U.S. patent application Ser. No. 17/083,075 entitled ESA Based Altimeter, filed 28 October, 2020, now U.S. Pat. No. 11,731,840; and U.S. patent application Ser. No. 17/085,095 entitled ESA Collision Avoidance System and Method, filed 30 October, 2020, now U.S. Pat. No. 11,636,772, the contents of which above-named U.S. Patent Applications are herein incorporated by reference in their entirety.

BACKGROUND

Robust Ground Clutter Suppression (GCS) may be a goal of many Airborne Weather Radar (WxR) systems. Some WxR may have a desirable simple and low-cost architecture and a Low Pulse Repetition Frequency (PRF) capability to meet user demand and user desired performance. Some airborne WxR systems may employ simple algorithmic and hardware embodiments of GCS to optimize cost goals and remain cost competitive.

A robust radar system with high probability of detection GCS with commensurate low false alarm rate (FAR) Predictive Wind Shear (PWS) detection may be desirable since the antenna beam is required to look down toward a runway of intended landing on the earth's surface during approach. Additional onboard systems including weather detection, ground mapping, etc. may also benefit from robust GCS Current radars may perform GCS differentially by comparing the radar returns of two slightly different elevation pointing angles of electromechanically scanned slotted waveguide arrays (SWGA). Similar issues may arise when detecting airborne targets such as other aircraft.

Sophisticated multi-mode military airborne radars feature multiple-Pulse Repetition Frequency (PRF) and modulated waveforms to overcome these GCS challenges. However, such radar hardware architectures are prohibitively costly for a commercial operator.

Sophisticated GCS techniques, such as Space Time Adaptive Processing (STAAP) are routinely used within the military community, but are too computationally intensive requiring sophisticated hardware that are counter SWAP-C for the commercial operator. Additional electromechanically scanned GCS system may offer a 2-beam pattern (Azimuth/Elevation) or a 4-beam pattern which require a nontrivial time interval to raster scan, or "azimuthally pause and elevation jump" to acquire the radar returns of the 2-beam position/4-beam position radar returns. Unfortunately, it takes 8-16 seconds to complete the electrometrical scans to acquire the 2-beam and 4-beam patterns required for mechanical scanning. These systems expend valuable time within the radar's pulse epoch that could be used for additional radar multi-function Therefore, a need remains for a system and related method which may overcome these limitations and provide a novel solution to enable a plurality of fixed AESA to perform as individual full aperture arrays as well as segment into a plurality of subarrays enabling continuous GCS while simultaneous performing multiple additional functions.

SUMMARY

In one aspect, embodiments of the inventive concepts disclosed herein are directed to a multi-panel multi-function radar antenna system. The system may comprise a plurality of individual active electronically scanned array (AESA) mounted at a fixed azimuth onboard an aircraft, the plurality of individual AESA including two of a forward AESA having a forward fixed azimuth approximately parallel to a boresight of the aircraft and a top AESA having a top fixed azimuth approximately parallel to a lift vector of the aircraft. The system may also include a bottom AESA having a bottom fixed azimuth approximately parallel to a weight vector of the aircraft and an aft AESA having an aft fixed azimuth approximately parallel to a drag vector of the aircraft.

Each of the plurality of individual AESA may be configured for a segmented aperture enabling a first aperture beam having a first aperture beam characteristic, a first azimuth, and a first elevation, the segmented aperture also enabling one or more second aperture beams having a second aperture beam characteristic, a second azimuth, and a second elevation, each of the first aperture beam and the second aperture beam being independently steered, coherent, and simultaneously radiated from one of the plurality of individual AESA.

The system may also include an aircraft system onboard the aircraft configured to 1) receive a specific radar dataset from one of of the plurality of individual AESA and 2) perform a system function based on the specific radar dataset, the specific radar dataset provided by one of: the first aperture beam and the second aperture beam. For control, the system may employ a controller operatively coupled with the plurality of individual AESA and the aircraft system and a tangible, non-transitory memory configured to communicate with the controller, the tangible, non-transitory memory having instructions stored therein that, in response to execution by the controller, cause the controller to carry out each function of the system.

In function, the system may receive a first radar command from a first system of the aircraft system and a second radar command from a second system of the aircraft system, the first radar command includes the first aperture beam characteristic, the first azimuth, and the first elevation, the second radar command includes the second aperture beam characteristic, the second azimuth, and the second elevation and designate one of the plurality of individual AESA to carry out the first radar command and the second radar command based on the fixed azimuth.

In response to the first radar command and the second radar command, the system may segment the designated AESA into at least two AESA subarrays, based on the first radar command and the second radar command, to transmit the first aperture beam and the second aperture beam, the first aperture beam having the first aperture beam characteristic based on the first radar command and the second aperture beam having the second aperture beam characteristic based on the second radar command.

The system may then transmit and steer the first aperture beam based on the first radar command and the second aperture beam based on the second radar command and receive a first radar return from the first aperture beam and a second radar return from the second aperture beam via one of the plurality of individual AESA.

The system may digitally combine the first radar return from the first aperture beam and the second radar return from the second aperture beam via a digital signal processing to create a first specific radar dataset associated with the first system and a second specific radar dataset associated with the second system and supply the first system with the first specific radar dataset associated with the first system and the second system with the second specific radar dataset associated with the second system. The system may then execute the system function of the first system based on the first specific radar dataset associated with the first system and the system function of the second system based on the second specific radar dataset associated with the second system.

A further embodiment of the inventive concepts disclosed herein may include a method for multi-panel multi-function radar operation. The method may comprise receiving a first radar command from a first system onboard an aircraft, the first system associated with a plurality of individual active electronically scanned array (AESA) each mounted at an individual fixed azimuth onboard the aircraft, the first radar command includes a first aperture beam characteristic, a first azimuth, and a first elevation associated with a first aperture beam and receiving a second radar command from a second system onboard the aircraft, the second radar command associated with the plurality of AESA and includes a second aperture beam characteristic, a second azimuth, and a second elevation associated with a second aperture beam.

The method may also comprise receiving an aircraft state data from an aircraft state data sensor and determining a radar function hierarchy based on the aircraft state data. The method may also include designating one of the plurality of individual AESA to carry out the first radar command and the second radar command based on the radar function hierarchy and the individual fixed azimuth.

In response to the first radar command and the second radar command, the method may include segmenting the designated AESA into at least two subarrays based on the radar function hierarchy of radar function, to transmit and receive the first aperture beam and the second aperture beam, the first aperture beam having the first aperture beam characteristic based on the first radar command and the second aperture beam having the second aperture beam characteristic based on the second radar command.

The method may further include transmitting and steering the first aperture beam based on the first radar command and the second aperture beam based on the second radar command from the designated AESA and receiving a first radar return from the first aperture beam and a second radar return from the second aperture beam. Then the method may include digitally combining the first radar return and the second radar return via a digital signal processing and creating a first specific radar dataset associated with the first system and a second specific radar dataset associated with the second system.

The method may also include supplying the first system with the first specific radar dataset associated with the first system and the second system with the second specific radar dataset associated with the second system and executing the system function of the first system based on the first specific radar dataset associated with the first system and the system function of the second system based on the second specific radar dataset associated with the second system.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which:

FIGS. 4A-4D are diagrams of beam characteristics exemplary of one embodiment of the inventive concepts disclosed herein;

FIG. 14 is a diagram of a method flow in accordance with one embodiment of the inventive concepts disclosed herein.

DETAILED DESCRIPTION OF EXEMPLARY EMBODIMENTS

Figure 1:
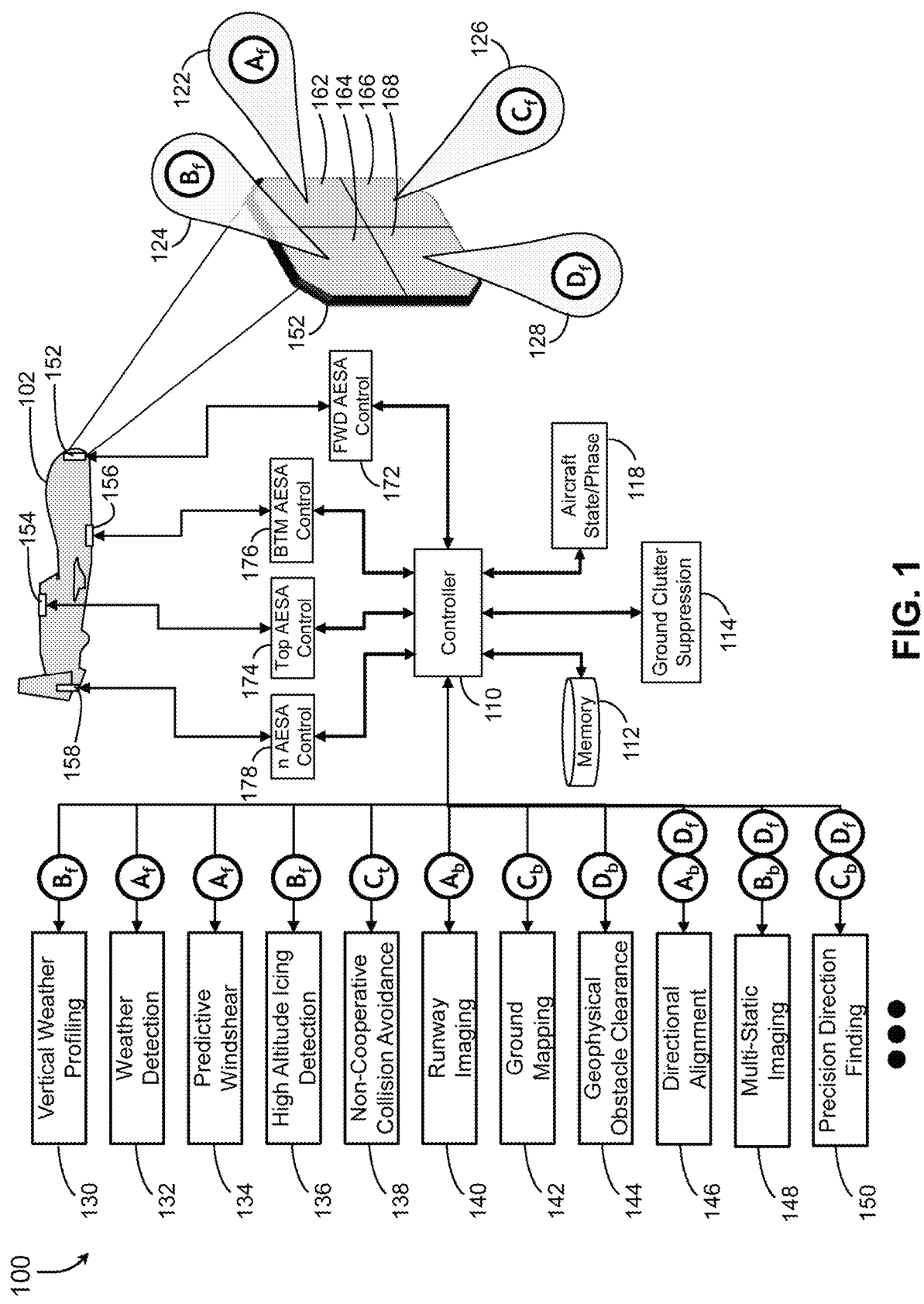
FIG. 1 is a diagram of a multi-panel multi-function radar antenna system in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

As used herein the term "approximately" in claim language as well as specification language may refer to a range of values plus or minus twenty percent (+/−20%) of the claimed value. For example, "approximately 100" may refer to, and therefore claim, the range of 80 to 120.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

OVERVIEW

Broadly, embodiments of the inventive concepts disclosed herein are directed to a system and method for a multi-panel multi-function active electronically scanned array (AESA) radar operation. The system receives radar commands from individual aircraft systems and segments a plurality of AESA panels fixed (at variable azimuth/elevation about the aircraft) into a plurality of subarrays to carry out each individual function commanded by the individual aircraft system. Dependent on aircraft status and phase of flight, the and individual AESA are designated for use and the subarrays are sized based on desired radar function at the specific phase of flight and specific threat associated with the phase. The system dynamically shifts the designated AESA, subarray size, beam characteristics, power settings, and function to enable multiple simultaneous function of the suite of AESA panels.

| REFERENCE CHART | |
|---|---|
| 100 | Multi-Panel Multi-Function Radar Antenna System |
| 102 | Aircraft |
| 110 | Controller |
| 112 | Memory |
| 114 | Ground Clutter Suppression (GCS) |
| 118 | Aircraft State Data Sensor |
| 122 | Forward (FWD) Beam A |
| 124 | FWD Beam B |
| 126 | FWD Beam C |
| 128 | FWD Beam D |
| 130 | Vertical Weather Profiling (VWP) |
| 132 | Weather Detection (WxR) |
| 134 | Predictive Windshear (PWS) |
| 136 | High Altitude Icing Detection (HAIC) |
| 138 | Non-Cooperative Collision Avoidance (NCCA) |
| 140 | Runway Imaging (RI) |
| 142 | Ground Mapping (GM) |
| 144 | Geophysical Obstacle Clearance |
| 146 | Directional Alignment |
| 148 | Multi-Static Imaging |
| 150 | Precision Direction Finding (DF) |
| 152 | Forward Active Electronically Scanned Array (AESA) |
| 154 | Top AESA |
| 156 | Bottom AESA |
| 158 | Rear AESA |
| 162 | FWD Subarray A |
| 164 | FWD Subarray B |
| 166 | FWD Subarray C |
| 168 | FWD Subarray D |
| 172 | FWD Antenna Control |
| 174 | Top Antenna Control |
| 176 | BTM Antenna Control |
| 178 | Aft Antenna Control |
| 200 | Data Flow |
| 212 | First, n Aperture Beam Characteristics |
| 214 | First, n Radar Returns |
| 222 | n Specific Radar Dataset |
| 224 | First Specific Radar Dataset |
| 230 | First System |
| 232 | First System Data Requirement |
| 234 | First Radar Command |
| 236 | First Designated AESA |
| 240 | Multi-Function Display (MFD) |
| 242 | Flight Crew |
| 250 | n System |
| 252 | n System Data Requirement |
| 254 | n Radar Command |
| 256 | n Designated AESA |
| 260 | User Interface |
| 262 | Unmanned Aircraft System (UAS) Mission Computer (MC) |
| 270 | FWD Left AESA |
| 272 | FWD Right AESA |
| 300 | Hardware Diagram |
| 302 | Analog Receiver 1 |
| 304 | Analog Receiver 2 |
| 306 | Analog Receiver 3 |
| 308 | Analog Receiver 4 |
| 312 | Analog to Digital Converter (ADC) 1 |
| 314 | ADC 2 |
| 316 | ADC 3 |
| 318 | ADC 4 |
| 320 | Beam Steering Computer |
| 322 | RF Exciter |

-continued

REFERENCE CHART

| | |
|---|---|
| 324 | Transmitter |
| 326 | n way delay splitter |
| 400 | Beam Characteristics Diagram |
| 404 | Azimuth |
| 406 | Elevation |
| 408 | AESA Plane |
| 412 | FWD AESA Boresight |
| 414 | Top AESA Azimuth |
| 416 | BTM AESA Azimuth |
| 418 | Aft AESA Azimuth |
| 422 | Beam A Vector |
| 424 | Beam A Azimuth |
| 426 | Beam A Elevation |
| 428 | Amplitude |
| 430 | Phase |
| 432 | Wide Azimuth Scan |
| 434 | Medium Azimuth Scan |
| 436 | Narrow Azimuth Scan |
| 442 | Wide Elevation Scan |
| 444 | Medium Elevation Scan |
| 446 | Narrow Elevation Scan |
| 500 | Approach Configuration Diagrams |
| 522 | Adjacent Beam 3 |
| 524 | Adjacent Beam 4 |
| 552 | Adjacent FWD AESA |
| 600 | Cruise Configuration Diagrams |
| 602 | Threat Aircraft |
| 604 | Comm Satellite |
| 622 | Bottom Beam A |
| 624 | Bottom Beam B |
| 626 | Bottom Beam C |
| 628 | Bottom Beam D |
| 632 | Top Beam A |
| 634 | Top Beam B |
| 690 | Passive Target |
| 692 | Active Target |
| 700 | Exemplary Configurations |
| 726 | FWD Beam E |
| 728 | FWD Beam F |
| 800 | Multi-AESA Multi-Function Diagram |
| 802 | FWD AESA Coverage |
| 804 | Top AESA Coverage |
| 806 | BTM AESA Coverage |
| 808 | Aft AESA Coverage |
| 854 | Bottom Aft AESA |
| 900 | Directional Alignment Diagram |
| 952 | Left Wingtip AESA |
| 954 | Left Fuselage AESA |
| 956 | Right Fuselage AESA |
| 958 | Right Wingtip AESA |
| 1000 | Multi-Static Examples |
| 1100 | Precision DF Architecture |
| 1200 | Multi-Frequency Architecture |
| 1300 | Chevron Architecture |
| 1400 | Method Flow |

FIG. 1

Referring to FIG. 1, a diagram of a multi-panel multi-function radar antenna system in accordance with an embodiment of the inventive concepts disclosed herein is shown. Generally, a multi-panel multi-function radar antenna system 100 may include a plurality of individual active electronically scanned array (AESA) mounted at a fixed individual azimuth onboard an aircraft 102. Also onboard the aircraft 102, a plurality of systems may provide an associated plurality of function to enable the aircraft 102 to perform as desired.

In one embodiment, the plurality of individual AESA includes two or more of a forward AESA 152 having a forward fixed azimuth approximately parallel to a boresight of the aircraft, a top AESA 154 having a top fixed azimuth approximately parallel to a lift vector of the aircraft, a bottom AESA 156 having a bottom fixed azimuth approximately parallel to a weight vector of the aircraft, and an aft AESA 158 having an aft fixed azimuth approximately parallel to a drag vector of the aircraft. Each fixed azimuth of each of the individual AESA may be defined as normal to a plane of the individual AESA 152-158 (see FIG. 4).

The plurality of systems may include one or more aircraft systems onboard the aircraft configured to 1) receive a specific radar dataset from one or more of the individual AESA and 2) perform a system function based on the received specific radar dataset, the specific radar dataset provided by one of the first aperture beam and the second aperture beam. The plurality of systems may include a vertical weather profiling system 130, a weather detection system 132, a predictive windshear system (PWS) 134, a high-altitude icing detection (HAIC) system 136, a non-cooperative collision avoidance system 138, a runway imaging system 140, a ground mapping (GM) system 142, a geophysical obstacle clearance system (GOC) 144, a radar directional alignment system 146, a multi-static imaging system 148, and a precision direction finding (DF) system 150.

Contemplated herein, additional aircraft systems may be incorporated within the scope of the inventive concepts disclosed herein and the above listing of exemplary aircraft systems may operate by way of explanation.

In one embodiment of the inventive concepts disclosed herein, one or more of the individual AESA 152-158 may be configured for a segmented aperture enabling multiple beams radiated from multiple subarrays. In one embodiment, the multiple subarrays may radiate a first aperture beam having a first aperture beam characteristic, a first azimuth, and a first elevation. In one embodiment, the first aperture beam may be represented by beam $A_f$ 122 being radiated and received by the forward AESA 152.

As used herein, the controller 110 may command that each individual AESA 152-158 be segmented into the plurality of subarrays and radiate an associated plurality of beams. A subscript f (e.g., $D_f$) may represent a beam from the forward AESA 152, a subscript t (e.g., $D_t$) may represent a beam from the top, a subscript b (e.g., $D_b$) may represent a beam from the bottom, and a subscript a (e.g., $D_a$) may represent a beam from the aft AESA 158.

In one embodiment, the segmented aperture may also enable a plurality of second aperture beams having a second aperture beam characteristic, a second azimuth, and a second elevation. In one embodiment, the plurality of second aperture beams may be represented by beams $B_f$ 124, $C_f$ 126, and $D_f$ 128. In one embodiment of the inventive concepts disclosed herein, each of the first aperture beam and the plurality of second aperture beams may be independently steered, coherent, and simultaneously radiated from the individual subarrays within one or more of the individual AESA 152-158.

In one embodiment of the inventive concepts disclosed herein, one or more of the individual AESA 152-158 may be segmented in a symmetric quad configuration into an exemplary four subarrays including subarray A 162, subarray B 164, Subarray C 166 and subarray D 168 able to independently steer and radiate the plurality of beams 122-128.

In one embodiment of the inventive concepts disclosed herein, the multi-panel multi-function radar antenna system 100 may include a controller 110 operatively coupled with the plurality of individual AESA 152-158 and the aircraft system 130-150. In turn, the controller 110 may also be coupled with a tangible, non-transitory memory 112 configured to communicate with the controller 110, the tangible, non-transitory memory 112 may have instructions stored therein that, in response to execution by the controller 110, cause the controller 110 to carry out each function associated with the multi-panel multi-function radar antenna system 100.

In one embodiment, the controller 110 may also operatively couple with and antenna control for each of the individual AESA 152-158. The antenna controls may include a forward (FWD) antenna control 172, a top antenna control 174, a bottom (BTM) antenna control 176, and an aft antenna control 178, each configured for controlling each function of their respective individual AESA with more detail in FIG. 3.

In some embodiments, an aircraft state sensor 118 may function to supply the controller with a state data and phase of flight associated with the aircraft 102. In one embodiment, the state data may represent an altitude, an airspeed, a climb configuration, a descent configuration, a cruise configuration, an approach configuration, a landing configuration, and a taxi configuration.

In one embodiment, the controller 110 may further couple with a ground clutter suppression (GCS) function 114 configured for continuously suppressing ground clutter as required by each individual aircraft system 130-150. In one embodiment, the GCS function 114 may be a function within the controller 110. However, as GCS may be a continuous function relevant to each aircraft system 130-150, it may be represented here as a separate and continuous function.

FIG. 2

Figure 2:
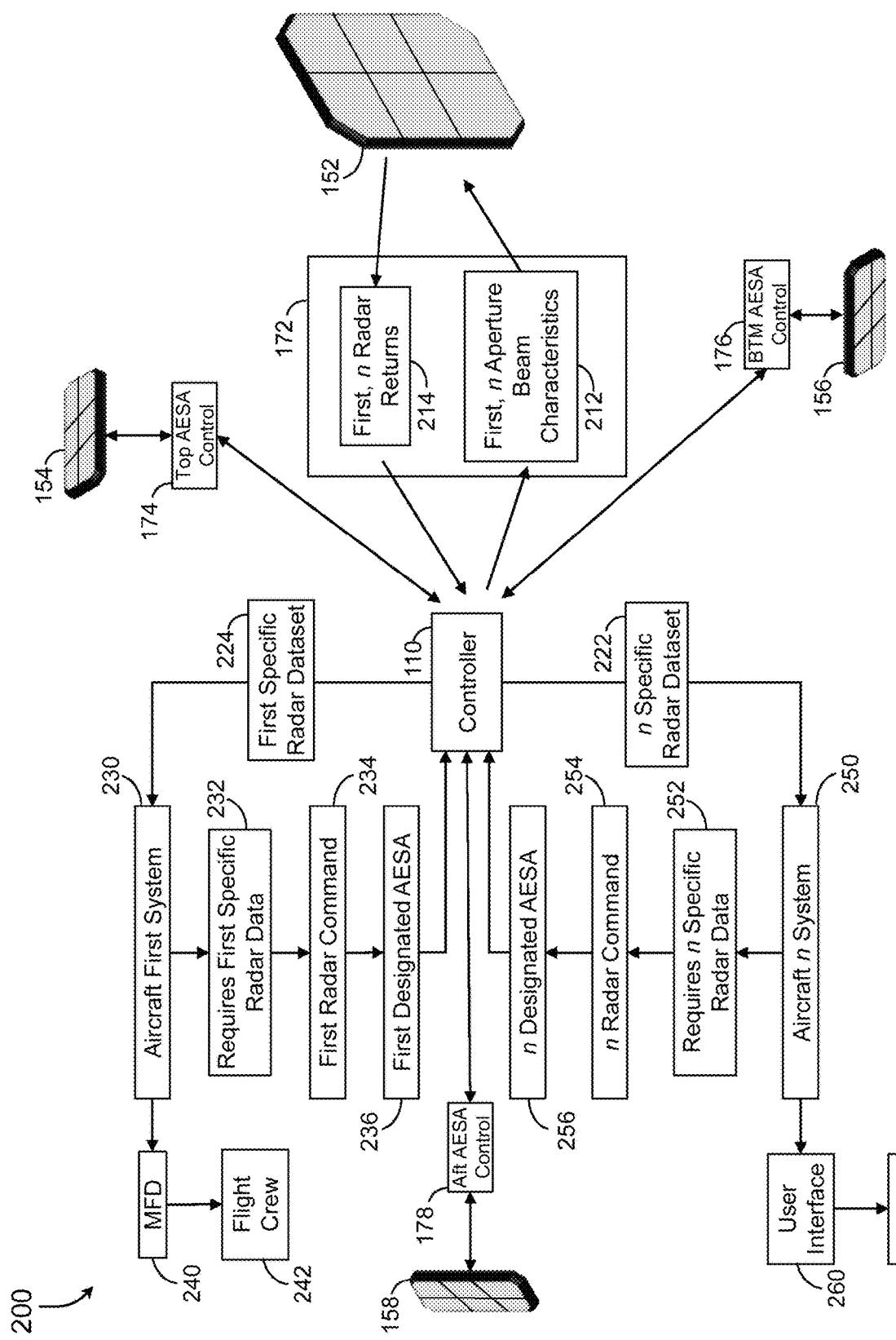
FIG. 2 is a diagram of an exemplary data flow in accordance with an embodiment of the inventive concepts disclosed herein.

Referring now to FIG. 2, a diagram of an exemplary data flow in accordance with an embodiment of the inventive concepts disclosed herein is shown. The multi-panel multi-function radar antenna system 100, through the controller 110, may function to receive a first radar command 234 from a first system 230 of the aircraft systems and a n radar command 254 from one or more n system 250 of the aircraft systems. In one embodiment, the first radar command 234 may include the first aperture beam characteristics, the designated AESA 236 for operation, and a first specific data requirement 232 of the first system 230. Further included in the first radar command 234 may be the first azimuth and the first elevation associated with the first beam 122.

In one embodiment, the controller 110 may also receive the second or n radar command 254 including a required specific radar data 252 for operation. The n radar command 254 may similarly include the second aperture beam characteristic, the designated AESA 256 for operation, the second azimuth, and the second elevation.

In response to the first radar command 234 and the n radar command 254, the controller 110 may designate one or more of the plurality of individual AESA 152-158 to carry out the first radar command and the second radar command based on the fixed azimuth. In one embodiment, the specific radar data desired by the aircraft system may lead the controller 110 to designate the specific AESA for the operation. For example, a PWS related radar command may enable the controller 110 to designate the FWD AESA 152 and the BTM AESA 156 for PWS operation. Similarly, a radar command related to the radar alignment may include the BTM AESA 156.

In response to the first radar command 234 and the n radar command 254, the controller 110 may segment each of the plurality of individual, and designated, AESA 152-158 into at least two AESA subarrays 162-168, based on the first radar command 234 and the n radar command 254. In transmit, the controller may command each of the first, n beam characteristics 212 to transmit the specific beams commanded by the specific aircraft system. Each individual subarray 162-168 may transmit and receive the first aperture beam 122 and the n aperture beam 124-128, the first aperture beam 122 having the first aperture beam characteristic based on the first radar command 234 and the n aperture beam 124-128 having the second aperture beam characteristic based on the n radar command 254.

Each individual subarray 162-168 may transmit and steer, using analog beamforming architecture, the first aperture beam based on the first radar command 234 and the n aperture beam based on the n radar command 254. Here, each individual subarray may transmit an individual beam where the received signals may be digitally combined for analysis and additional signal processing.

In one embodiment, the any of the plurality of subarrays within the plurality of individual AESA 152-158 may receive a first radar return from the first aperture beam and an n radar return from the at n aperture beam 214 and digitally combine the first radar return from the first aperture beam and the n radar return from the n aperture beam via a digital signal processing to create a first specific radar dataset 224 associated with the first system 230 and a n specific radar dataset 222 associated with the n system 250.

In one embodiment, the controller 110 may supply the first system 230 with the first specific radar dataset 224 associated with the first system 230 and the n system 250 with the n specific radar dataset 222 associated with the n system. Once supplied, the controller may execute the system function of the first system 230 based on the first specific radar dataset 224 associated with the first system and the system function of the n system 250 based on the second specific radar dataset 222 associated with the n system.

In one embodiment, the first system 230 may couple with a multi-function display (MFD) 240 enabling a flight crew 242 to visualize a result of the first system 230 and make decisions based on the displayed information. Conversely, should the n system 250 be sited on an unmanned aircraft system (UAS), the controller 110 may command the aircraft n system 250 supply a user interface 260 able to configure the n specific radar dataset 222 for consumption and use by a UAS mission computer (MC) 262.

FIG. 3

Figure 3:
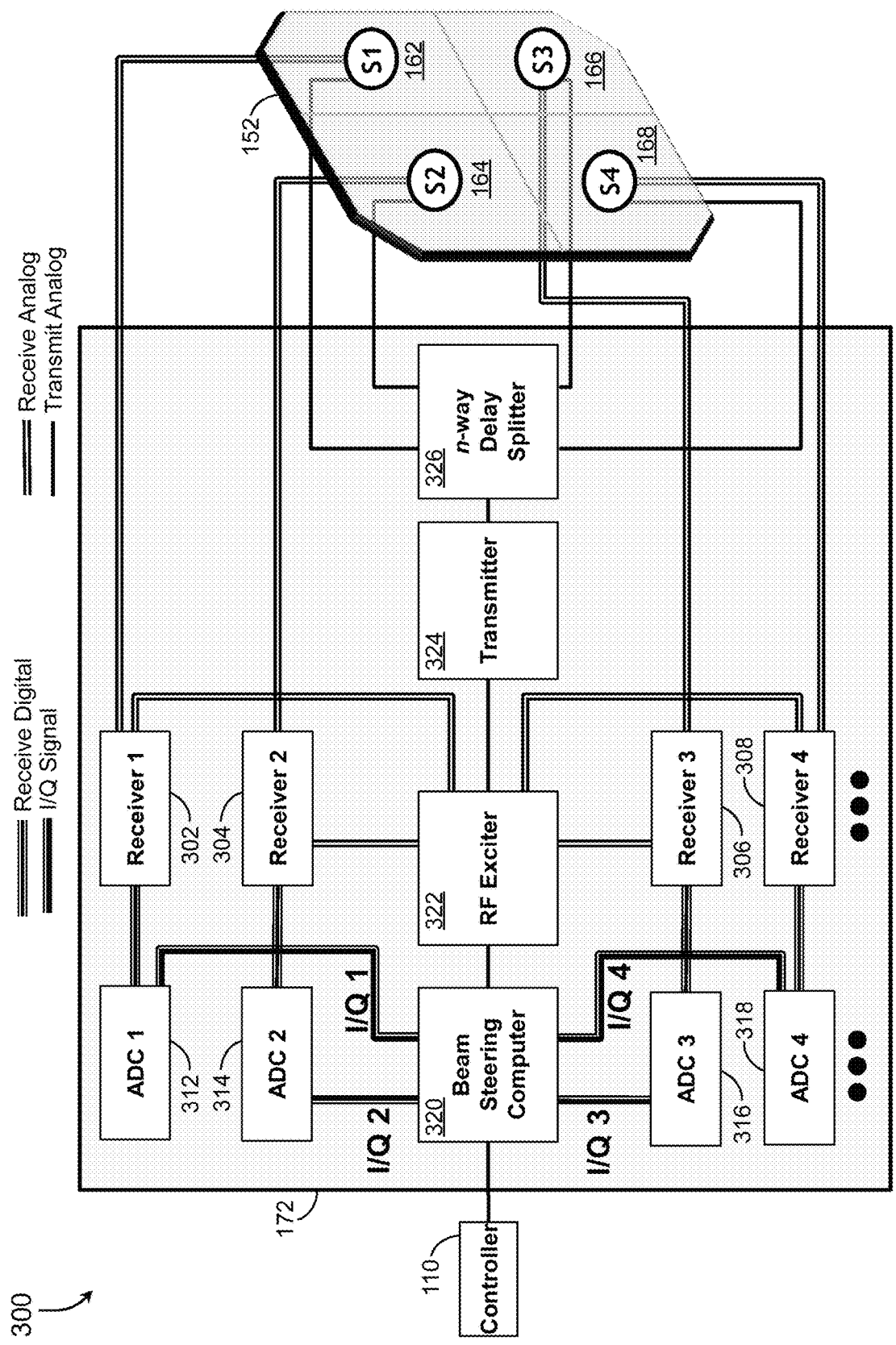
FIG. 3 is a diagram of a hardware diagram exemplary of an embodiment of the inventive concepts disclosed herein.

Referring now to FIG. 3, a diagram of a hardware diagram exemplary of an embodiment of the inventive concepts disclosed herein is shown. The hardware diagram 300 may indicate an exemplary FES AESA 152 path and may represent similar pathways to the additional plurality of individual AESA 152-158. The hardware diagram 300 may include, on a transmit flow, a beam steering computer 320, a radio frequency (RF) exciter 322, a transmitter 324, and an n way delay splitter 326 prior to reaching any of the plurality of individual AESA 152-158.

In receive, the antenna control 116 may include Analog Receiver 1 302, Analog Receiver 2 304, Analog Receiver 3 306, and Analog Receiver 4 308 feeding Analog to Digital Converter (ADC) 1 312, ADC 2 314, ADC 3 316 and ADC 4 318. ADCs may function to receive the analog signals and digitize to each of the in-phase and quadrature (I/Q) signals I/Q 1 through 4 prior to sending the signals to the controller 110. Here, the receive signal may be down converted to I/Q while the transmit may be analog. In one embodiment, the transmit signal may also be digital.

In one embodiment, the multi-panel multi-function radar antenna system 100 may enable a full or segmented aperture, single beam sum and difference patterns where each subarray may employ a directive 2D scanned analog AESA. The controller 110 may enable pattern synthesis by element-level amplitude and phase adjustment superimposed on the 2D bean steering command. The architecture may enable multiple full aperture receive beams with variable azimuth, variable elevation, and beam summing steered in the same direction.

In one embodiment, the multi-panel multi-function radar antenna system 100 may enable subarray level receive digital beam forming (DBF) with a multi-subarray configuration where each DBF radiating "element" is a directive 2D scanned analog AESA (e.g., within a subarray) and each subarray may have independent pattern synthesis and beam pointing.

FIG. 4

Referring now to FIGS. 4A-4D, diagrams of beam characteristics exemplary of one embodiment of the inventive concepts disclosed herein are shown. In one embodiment, the beam characteristics diagram 400 may indicate exemplary beam characteristics each of the plurality of aperture beams 122-128 within the plurality of individual AESA 152-158 may possess.

In one embodiment, each aircraft system 130-150 may command a radar command 234 including the designated AESA, an aperture beam power (gain), an AESA segment size (symmetric and asymmetric), a beamwidth (narrow, wide, medium), an amplitude control 428, a phase control 430, an azimuth scan (narrow, wide, medium), an elevation scan (narrow, wide, medium), and a side lobe level relative to a main beam peak (high/low).

In one embodiment, the designated AESA may be a function of the aircraft system sending the radar command. For example, a WxR 132 may use the FWD AESA 152 and possibly the BTM AESA 156 while a communication system may command only the top AESA 154 for satellite communication in addition to other data communication systems (e.g., data links, voice, etc). Additionally, a NCCA system 138 may command a portion of each AESA onboard in certain aircraft states where traffic may be one concern.

In one embodiment, the aperture beam power may be commanded by the radar command to one of a high power of approximately 155-205 dBm, a medium power of approximately 103-154 dBm, and a low power of approximately 51-102 dBm, as the radar is operated with, for example, a 1-25% duty cycle. In this manner, the radar command may not only command a specific approximate power, but also an AESA segment size.

In one embodiment of the inventive concepts disclosed herein, the AESA subarray segment size may determine power available to the associated beam and thus target acquisition available to the associated aircraft system. A large aperture size may approximate 0.50 (half) to 1.00 (all) of the total AESA 152-158. A large subarray size may be limited to specific circumstances where the aircraft state may be in a position for an immediate action response such as in a windshear event or other scenario where most or all of the radar resources should be devoted to the specific (e.g. PWS) system.

Similarly, a medium subarray size may approximate 0.25 (one quarter) to 0.5 (half) of the entirety of the AESA 152-158. A small subarray size may approximate sizes less than 0.25 enabling a plurality of systems to access the limited amount of function within the AESA 152-158.

In one embodiment, the beamwidth of each aperture beam may be inversely proportional to the aperture beam effective isotropic radiate power (EIRP) which may be a product of power amplifier power and passive aperture gain. For example, a high-power aperture beam may possess a narrow beamwidth while a low power aperture beam may possess a wide beamwidth. The passive aperture gain is varied with in the EIRP as the beamwidth is changed. This may assume that all the of the elements are transmitting a constant RF power. It may be further possible to modulate EIRP by turning the Tx power amplimer circuits associated with each radiating element on and off. Additionally, the controller 110 may command an adjustment to the individual power on each transmit RF signal chain feeding the radiating elements.

In one embodiment, the forward fixed AESA 152 may maintain an AESA plane 408 defined by a vertical axis y and lateral axis x. Relative to the FWD AESA plane 408, an azimuth 404, an elevation 406 may describe vectors relative to an AESA boresight 412 normal to an AESA plane 408. Similarly, each of the plurality of individual AESA 152-158 may maintain a plane of installation with the AESA fixed azimuth is normal to the plane. For example, the top AESA 154 may maintain a plane defined by the lateral axis x and the longitudinal axis z.

Each individual aperture beam may inherently possess a beam A vector 422 as directed by the radar command 234. An exemplary beam $A_f$ 122 may be defined by the power which may be relative to the AESA segment size. For example, a large AESA segment size may equate to a large available power available to the beam $A_f$ 122. The beam $A_f$ 122 may also be defined by the beamwidth which may also be dependent on power. For example, a greater power may offer a narrower beamwidth and thus greater range available to identify a specific target while a lesser power (with corresponding smaller aperture segment size) may offer a wider beamwidth and reduced range of target acquisition. In this example, the beam $A_f$ 122 may possess the beam A vector 422 including a beam $A_f$ azimuth 424 and a beam $A_f$ elevation 426 relative to the AESA boresight 412.

Figure 4C:
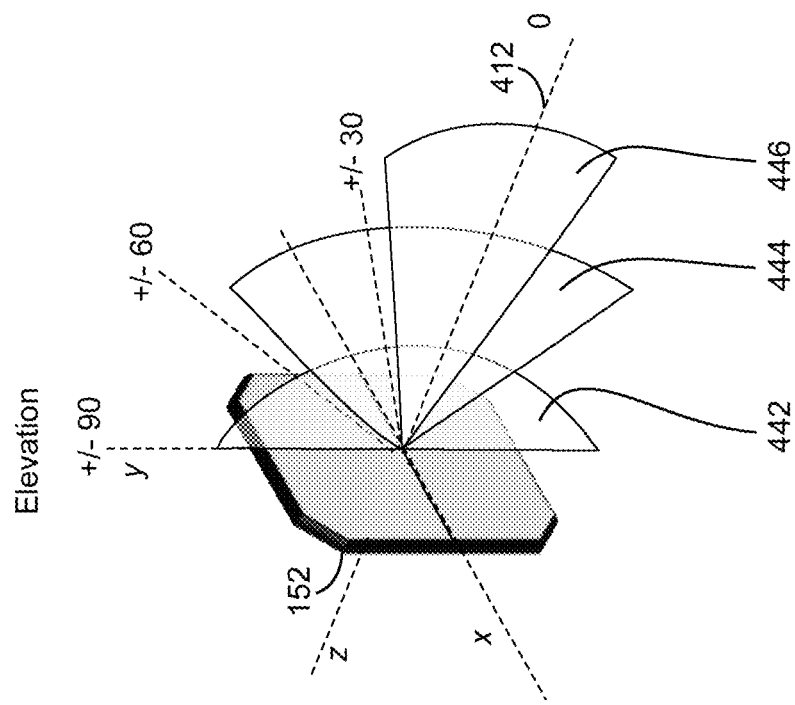
Figure 4B:
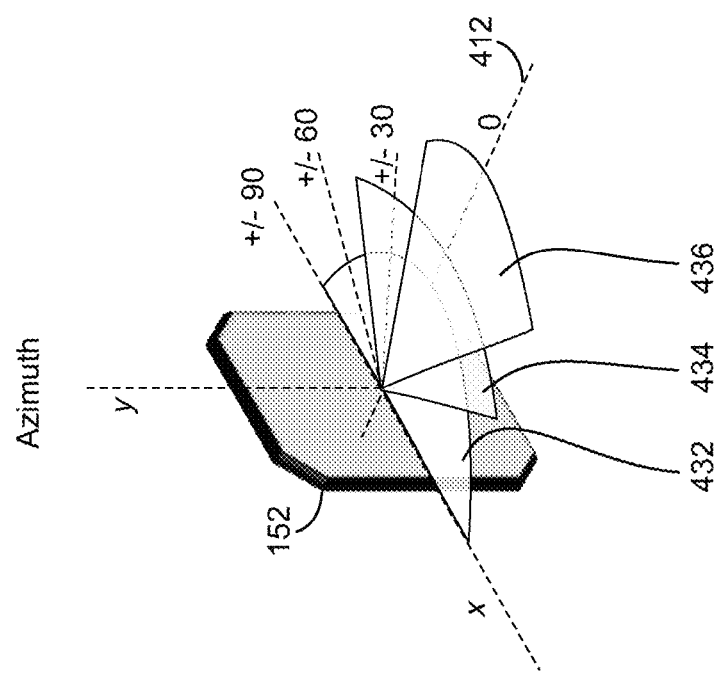

FIG. 4B may indicate exemplary azimuth scan volumes of each individual aperture beam 122-128 while FIG. 4C may indicate exemplary elevation scan volumes. A wide azimuth scan 432 may sweep the aperture beam approximately +/−80 degrees form the boresight 412, a medium azimuth scan 434 may sweep the aperture beam approximately +/−60 degrees from the boresight 412, while a narrow azimuth scan 436 may limit the aperture beam to sweep approximately +/−30 from the boresight 412.

Similarly in elevation, FIG. 4C each individual aperture beam 122-128 may indicate a wide elevation scan 442 may sweep the aperture beam approximately +/−80 degrees form the boresight 412, a medium elevation scan 444 may sweep the aperture beam approximately +/−60 degrees from the boresight 412, while a narrow elevation scan 446 may limit the aperture beam to sweep approximately +/−30 from the boresight 412.

In one embodiment of the inventive concepts disclosed herein, the side lobe level may indicate how much side lobe interference the aircraft system is willing to tolerate and remain functional offering valid data. In one embodiment, a low side lobe level may indicate the aircraft system may be susceptible to side lobe interference. For example, a ground mapping system operating below 10,000 ft MSL may be susceptible to a side lobe interference given a low power output and proximity to the ground. Conversely, a high side lobe level may indicate a lower susceptibility to side lobe interference. For example, a high-altitude icing detection system may be less likely to be affected by side lobe interference given the high altitude and likely smaller elevation scan volume.

In one embodiment of the inventive concepts disclosed herein, the controller 110 may command a specific subarray configuration based on the received radar commands. In one embodiment, the weather detection system 132 radar command may include a high power, a large AESA segment size, a narrow beamwidth, and a low side lobe level. In another embodiment, the vertical weather profiling system 130 may command a medium power, a medium AESA segment size, a narrow beamwidth, a large elevation scan, and a low side lobe level.

Figure 4D:
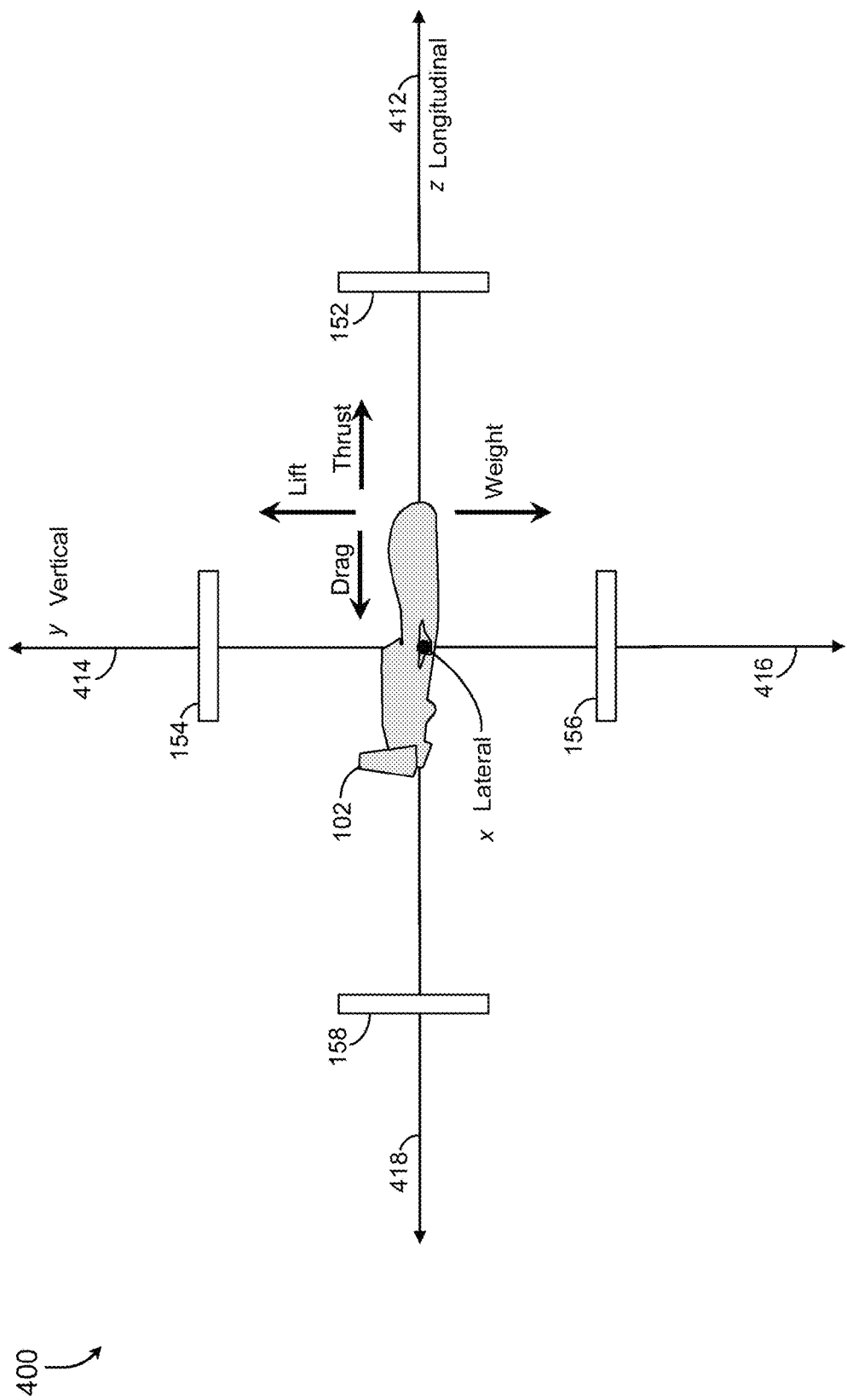

Referring to FIG. 4D, each fixed azimuth of each individual AESA may be shown. As indicated above, the FWD AESA 152 may maintain the fixed azimuth approximately parallel to the aircraft boresight 412. In one embodiment, the top AESA 154 fixed azimuth 414 approximates the lift vector, the BTM AESA 156 fixed azimuth 416 approximates the weight vector, and the aft AESA 158 fixed azimuth 148 may approximate the drag vector.

FIG. 5

Figure 5A:
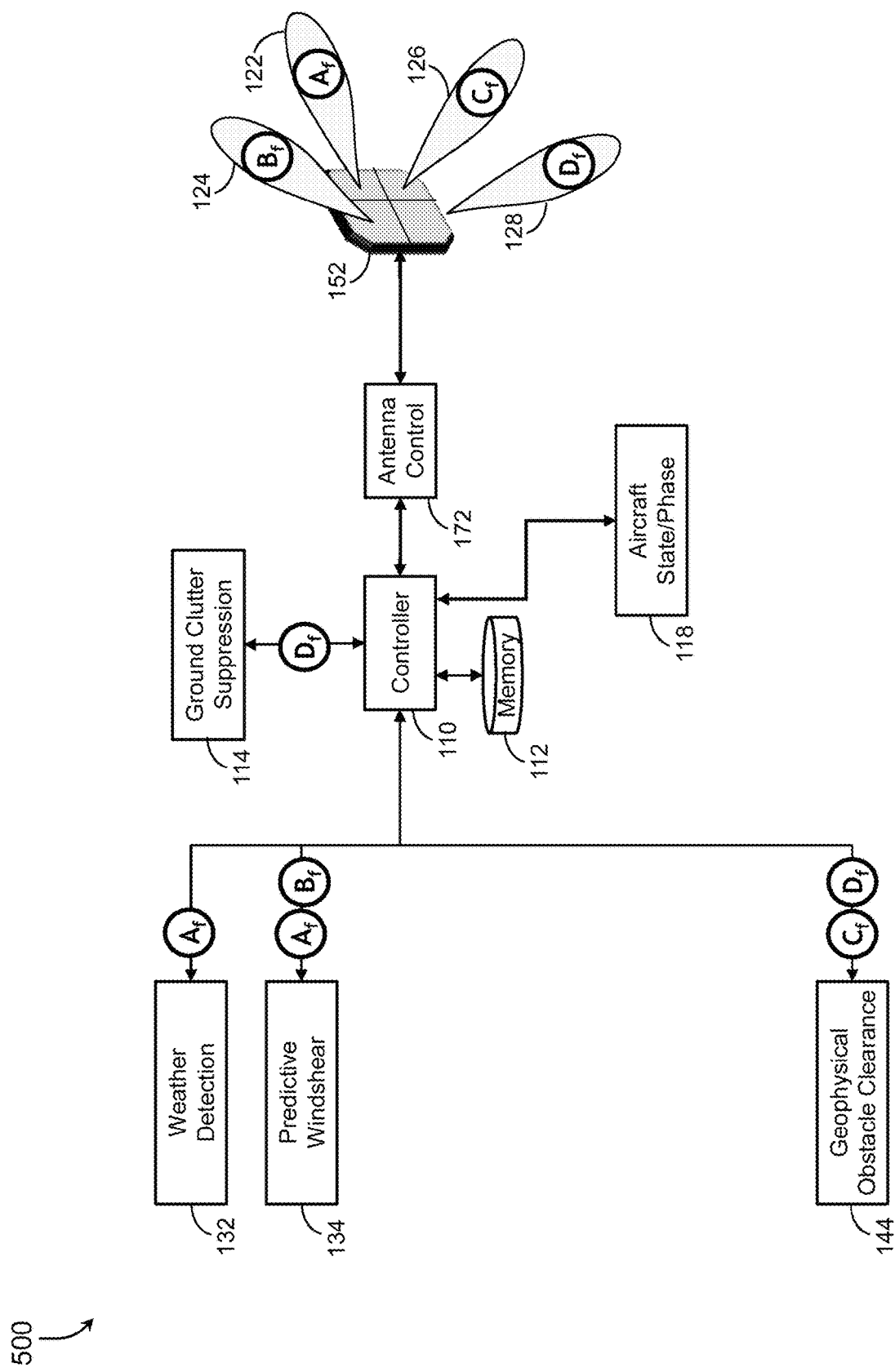
FIGS. 5A and 5B are diagrams of an exemplary approach aircraft state configuration and scenario in accordance with one embodiment of the inventive concepts disclosed herein.
Figure 5B:
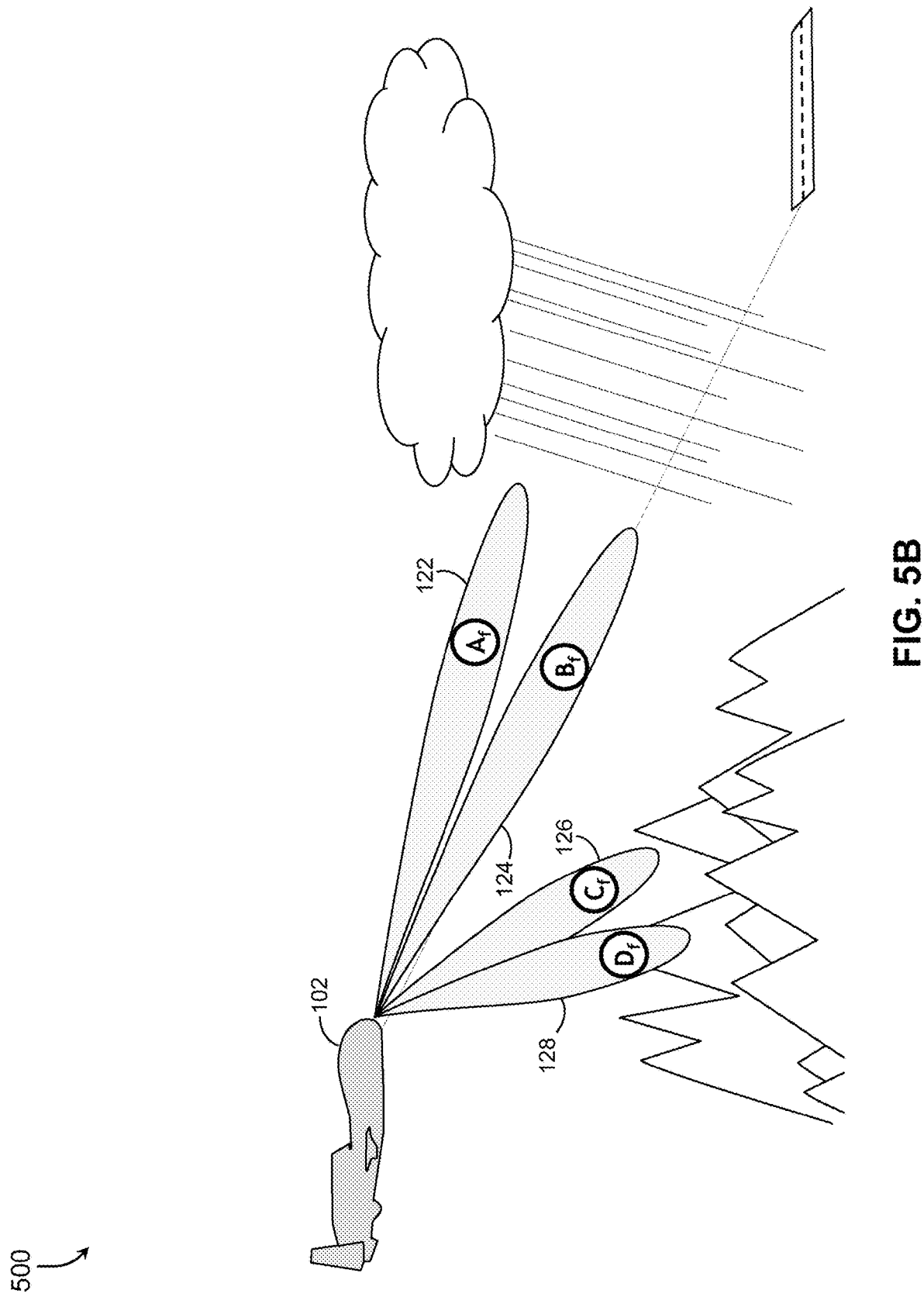

Referring now to FIGS. 5A and 5B, diagrams of an exemplary approach aircraft state configuration and scenario 500 in accordance with one embodiment of the inventive concepts disclosed herein are shown. One exemplary approach configuration may include a scenario with the aircraft state being on an approach to intended landing where the weather detection system 132, the PWS 134, and the GOC system 144 are operational and sharing any of the plurality of individual AESA 152-158.

In one embodiment, the predictive windshear system 134 may command one of the forward AESA, the top AESA, and the bottom AESA, a high power, a large AESA segment size, a narrow beamwidth, a medium azimuth scan, a medium elevation scan, and a low side lobe level while the high altitude icing detection system 136 may command a high power, a medium AESA segment size, a narrow beamwidth, and a high side lobe level.

At low altitude on approach, GCS 114 may be one high priority for use of one of the aperture beams. Here, FWD aperture beam $D_f$ 128 may function to supply information to the controller 110 for GCS a portion of the time while also supplying information to the GOC system 144 during the remaining time. As obstacle clearance may be a lower elevation scan than each of the weather and PWS, the controller 110 has commanded any of the plurality of individual AESA 152-158 to a quad configuration enabling FWD aperture beams $C_f$ 126 and $D_f$ 128 available to the GOC system 144. The controller 110 has commanded the FWD aperture beam $A_f$ 122 available to the weather detection system 132 while each of the FWD aperture beams $A_f$ 122 and $B_f$ 124 are available to the PWS 134. Also in this example, FWD aperture beam $A_f$ 122 may be allotted to the weather detection system 132 and the PWS 134 on a time sharing basis where a first time slot and beam characteristic is made available to the weather detection system 132 while a second time slot and second bean characteristic are available to the PWS 134.

In one embodiment of the inventive concepts disclosed herein, the multi-panel multi-function radar antenna system 100 may include an aircraft state sensor configured to provide an aircraft state data and phase of flight to the controller 110. Here, the controller 110 may receive the aircraft state data and phase of flight and determine a radar function hierarchy based on the received aircraft state data and phase of flight. For example, the aircraft state data may indicate the aircraft is at 2000 ft AGL on an approach in an approach configuration. One exemplary radar function hierarchy may have PWS 134 near the top since windshear may be one of the highest threats to a safe landing.

In one embodiment, the controller 110 may also reference the radar function hierarchy as well as the fixed azimuth to designate the appropriate AESA useful to comply with the radar command. For example, at low altitude on approach where windshear is a high threat, one radar function hierarchy may include PWS with the FWD AESA 152 as a priority while other systems may be required to use other AESA for operation.

FIG. 5B may indicate the approach scenario with aperture beams $A_f$ 122 and $B_f$ 124 imaging the weather while aperture beams $C_f$ 126 and $D_f$ 128 are imaging the terrain. Of note, each individual aperture beam 122-128 is operating in compliance with the aircraft system radar command 234 254 with respect to power, subarray segment size, etc.

FIG. 6

Figure 6A:
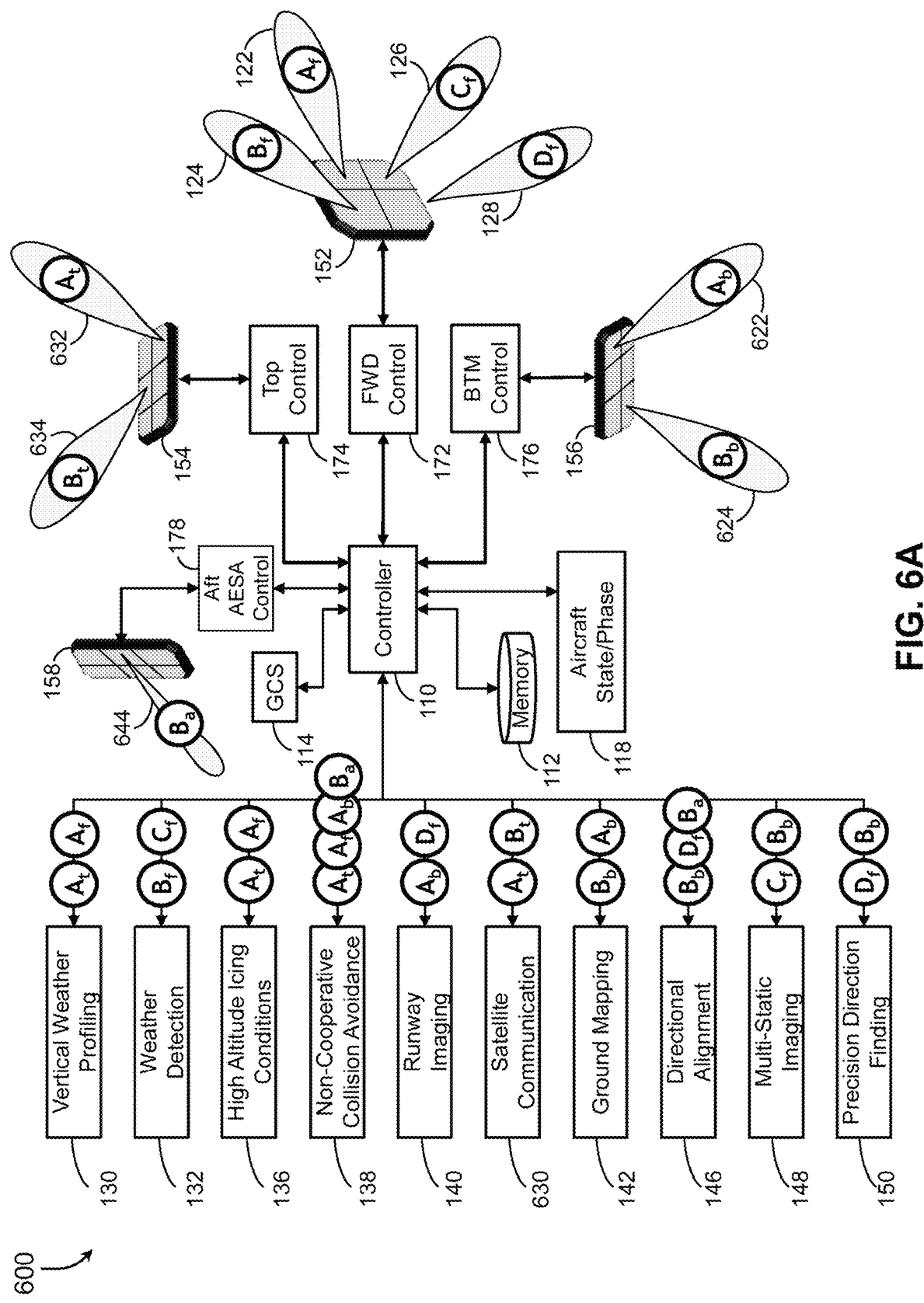
FIGS. 6A and 6B are diagrams of an exemplary cruise aircraft state configuration and scenario in accordance with one embodiment of the inventive concepts disclosed herein.
Figure 6B:
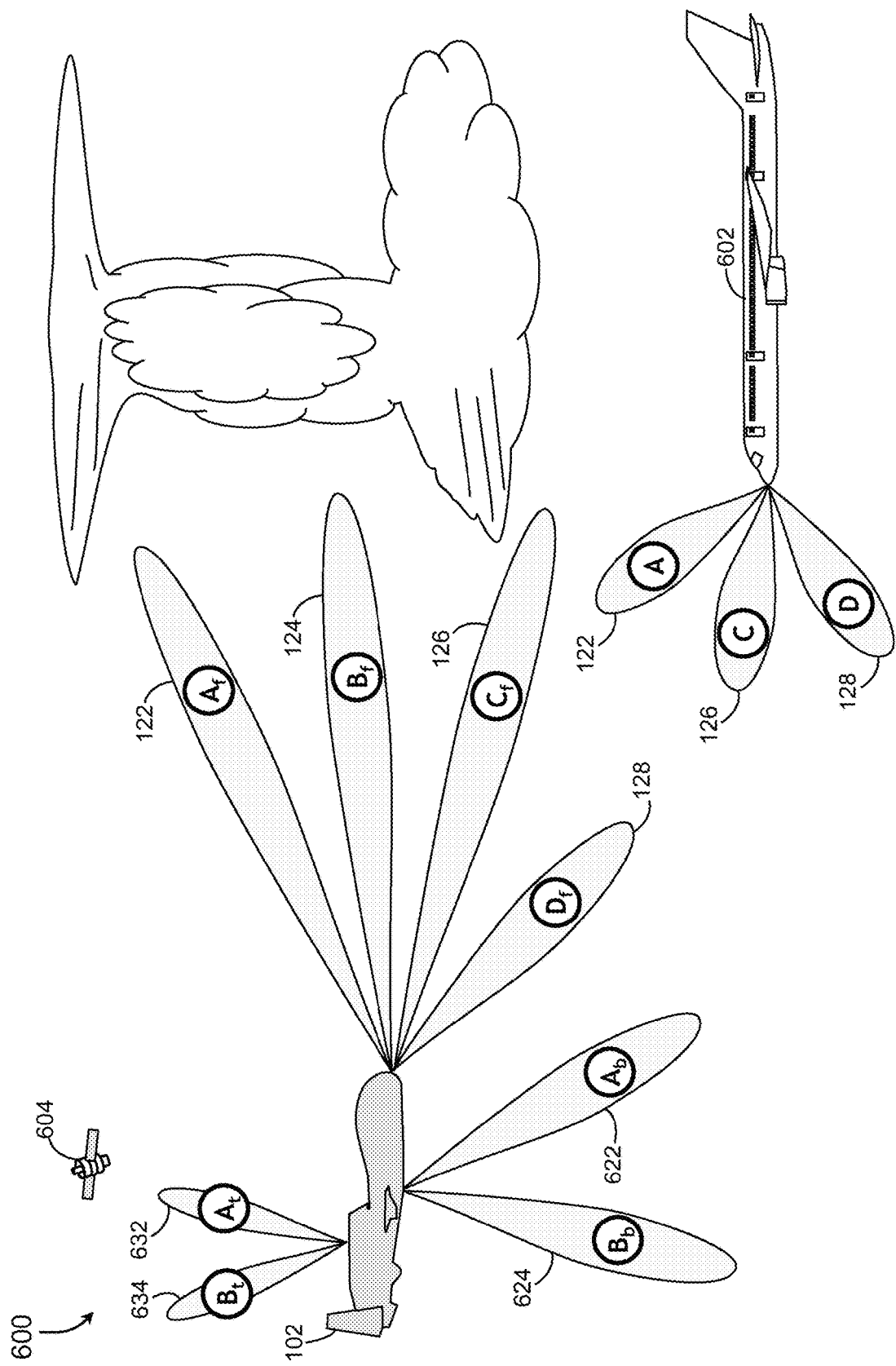

Referring now to FIGS. 6A and 6B, diagrams of an exemplary cruise aircraft state configuration and scenario 600 in accordance with one embodiment of the inventive concepts disclosed herein are shown. In this cruise high altitude example, an exemplary ten aircraft systems are sharing the limited space and time available on any of the plurality of individual AESA 152-158. Here, the vertical weather profiling system 130, the weather detection 132, the HAIC system 136, the NCCA system 138, the runway imaging system 140, the satcom 630, the directional alignment system 146, the multi-static imaging system 148 and the precision DF 150 are either space sharing or time sharing any of the plurality of individual AESA 152-158 as indicated by the labeled beams providing the radar dataset to each specific aircraft system 130-150.

In one embodiment, the multi-panel multi-function radar antenna system 100 may enable simultaneous multiple beams for successful GCS 114 as one beam from one AESA (e.g., FWD 152) may be configured for the target detection (e.g. rain) and a second beam from a second AESA (e.g., bottom 156) may be configured to characterize ground clutter. The controller 110 may co-process the separate beams to extract the rain signal out of the ground clutter.

In one embodiment, the specific aircraft system within the radar command may enable the controller 110 to designate which AESA and which subarray within each AESA will provide the specific aircraft system with the specific dataset for operation.

In one embodiment, the VWP 130 may command each of the At and Af beams while the WxR 132 may command the Bf and Cf beams. Similarly, the HAIC 136 may employ the $A_t$ and $A_f$ beams while the NCCA 138 may command one beam from each AESA here, the $A_t$, $A_f$, $A_b$, and $B_a$ beams.

The runway imaging may employ the $A_b$ and $D_f$ beams while the satellite communications 630 or other communications/data link systems may command the $A_t$ and $B_t$ beams. Ground mapping may command the $B_b$ and $A_b$ beams within the BTM AESA 156 while the directional alignment system 146 may employ each of the $B_b$, $D_f$, and $B_a$ beams. Multi-static imaging may command the $C_f$ and $B_b$ beams while Precision $D_f$ 150 may employ $D_f$ and $B_b$ beams.

In another embodiment, the noncooperative collision avoidance system 138 may command any (or all) of the plurality of individual AESA, a low power, a small AESA segment size within each AESA, a wide beamwidth, a wide azimuth scan, a wide elevation scan, and a low side lobe level to detect a second aircraft and the ground mapping system 142 and wherein the second radar command further comprises a low power, a small AESA segment size, a narrow beamwidth, and a low side lobe level.

In another embodiment, the multi-panel multi-function radar antenna system 100 may enable multiple time coincident beam radar return acquisitions to enable coherency in the return signal to minimize a need for non-coherent return processing. Thus, the controller 110 may eliminate a requirement for a temporal filter to retain coherency.

In one embodiment, the controller 110 may command a time-based switching of a function of a specific AESA and subarray beam therein between compliance with the first radar command and compliance with the second radar command. In one example, VWP 130 and HAIC 136 may be time sharing aperture beams $A_t$ 632 and $A_f$ 122. Here, Multiple beams at differing elevations from different AESAs may enable differential dBz measurements for hail detection and icing detection.

In one embodiment, the controller 110 may command a dynamic Inter subarray reconfiguration combining two or more subarrays and tailoring the excitation of the combined subarray. For example, one inter subarray reconfiguration may include the controller 110 changing one subarray from GM 142 to WX 132 or alternating the function of a subarray from one function to another at alternating times.

In one embodiment, the controller 110 may command a dynamic control of the radiation properties (amplitude/phase/bandwidth etc) of each subarray to create aircraft system application (Contingency Operations) specific beam patterns. For example, the second radar command may include each of the amplitude control 428 and the phase control 430 to enable a radiation pattern synthesis between the two subarrays (e.g., $A_t$, $A_f$, $A_b$, $B_a$ for NCCA 138), and executing the system function of the second system is based on the radiation pattern synthesis.

In one embodiment, the multi-panel multi-function radar antenna system 100 may enable multiple beams of differing pattern characteristic to offer simultaneous radar mode operation. For example, a cosecant squared antenna beam useful for ground mapping may be radiated simultaneous with non-cooperative collision avoidance beam.

In one embodiment, the runway imaging system 140, the ground mapping system 142, and the geophysical obstacle clearance system 144 may command any (but the top) of the plurality of individual AESA, a low power, a small AESA segment size, a wide beamwidth, and a low side lobe level.

FIG. 6B may indicate aperture beam availability as well as differences in power output of each aperture beam. As aperture beams $A_f$ $B_f$ and $D_f$ may be used by the VWP 130, output power of each of those may be increased for increased range to scan the vertical entirety of the weather system forward of the aircraft 102. As less power may be required of the NCCA 138, aperture beam $D_f$ 128 may maintain less power output (as well as less segment size within any of the plurality of individual AESA 152-158) for imaging a threat aircraft 602 and accurate operation.

Ground mapping 142 may maintain complete use of the BTM AESA 156 commanding each of the $A_b$ 622 and $B_b$ 624 beams.

FIG. 7

Figure 7C:
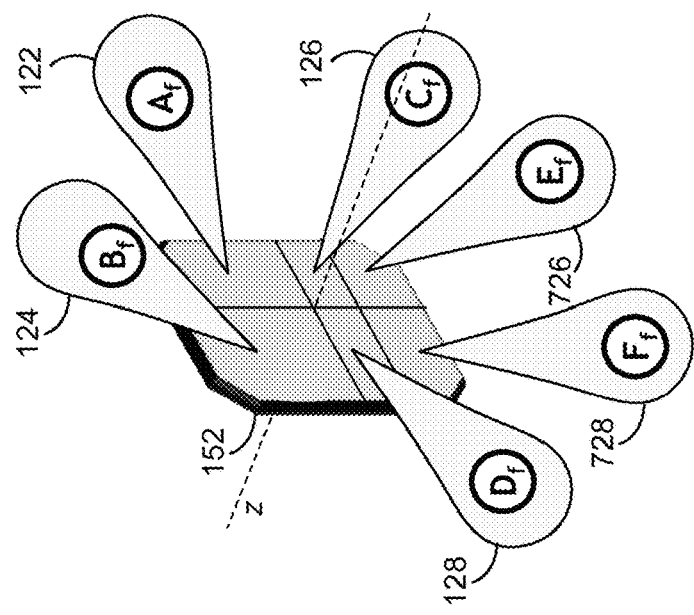
FIGS. 7A-7C are diagrams of exemplary subarrays and beam characteristics associated with one embodiment of the inventive concepts disclosed herein.
Figure 7B:
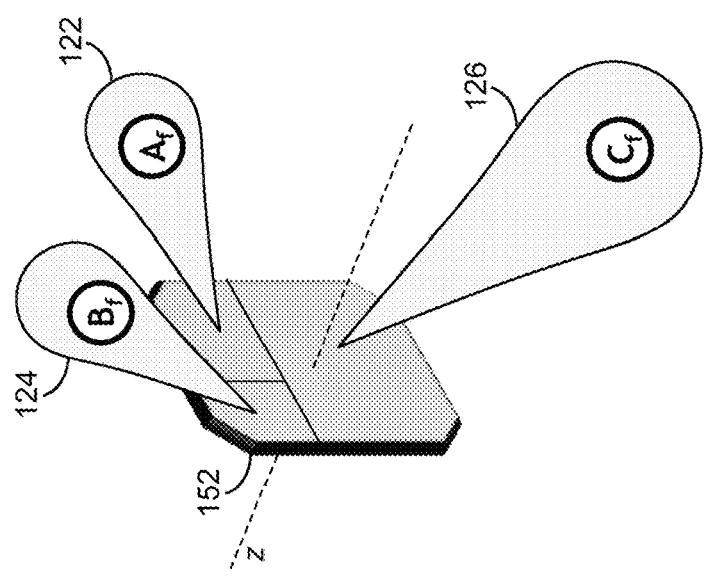
Figure 7A:
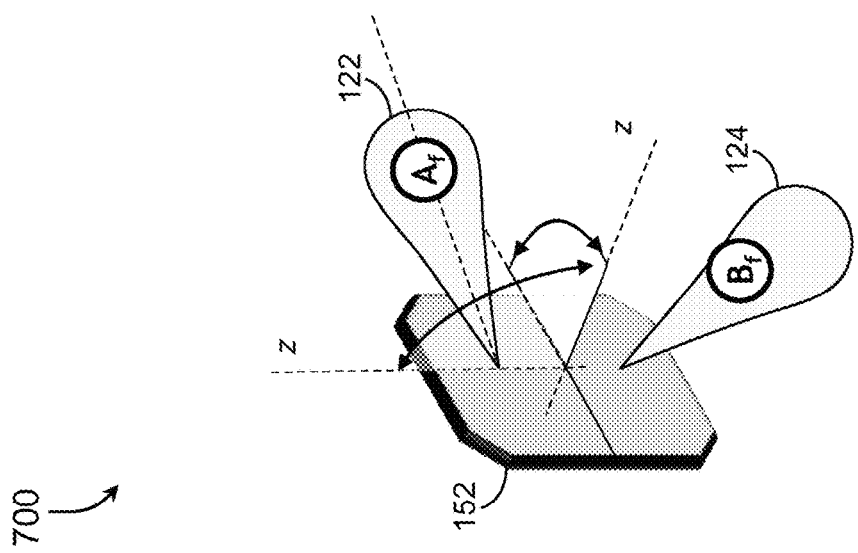

Referring now to FIGS. 7A-7C, diagrams of exemplary subarrays and beam characteristics associated with one embodiment of the inventive concepts disclosed herein are shown. Exemplary configurations 700 may indicate symmetric as well as asymmetric subarray segment sizes available as the controller 110 segments any of the plurality of individual AESA 152-158.

FIG. 7A may indicate a 50% split of any of the plurality of individual AESA 152-158 between aperture beam $A_f$ 122 and aperture beam $B_f$ 124. FIG. 7B may indicate one asymmetric configuration where aperture beam $C_f$ 126 may have a higher priority within the radar function hierarchy of radar function than aperture beams $A_f$ 122 and $B_f$ 124. Here, aperture beam $B_f$ 124 may have the smallest segment size enabling the smallest output power available for operation.

FIG. 7C may indicate one exemplary configuration with six asymmetric subarrays with corresponding segment sizes. One exemplary radar function hierarchy of radar function may include aperture beams $A_f$ 122 and $B_f$ 124 being the highest priority, Aperture beams $E_f$ 726 and $F_f$ 728 being next on the radar function hierarchy, and aperture beams $C_f$ 126 and $D_f$ 128 being at the lowest priority on the radar function hierarchy.

In one embodiment, the controller 110 may adaptively and cooperatively overcome obstructions caused by the angle of the sub-arrays relative to the target of interest. For example, if an air traffic target is over water or in a mountainous region it could take one single beam over water or several beams at different angles to accurately image the target out of the mountainous region depending on where it is relative to the system's sub-arrays. It could also be that one subarray tracking a target is suddenly obstructed given its position on the aircraft whereas another could swap missions with it in order to maintain the same level of situational awareness.

FIG. 8

Figure 8:
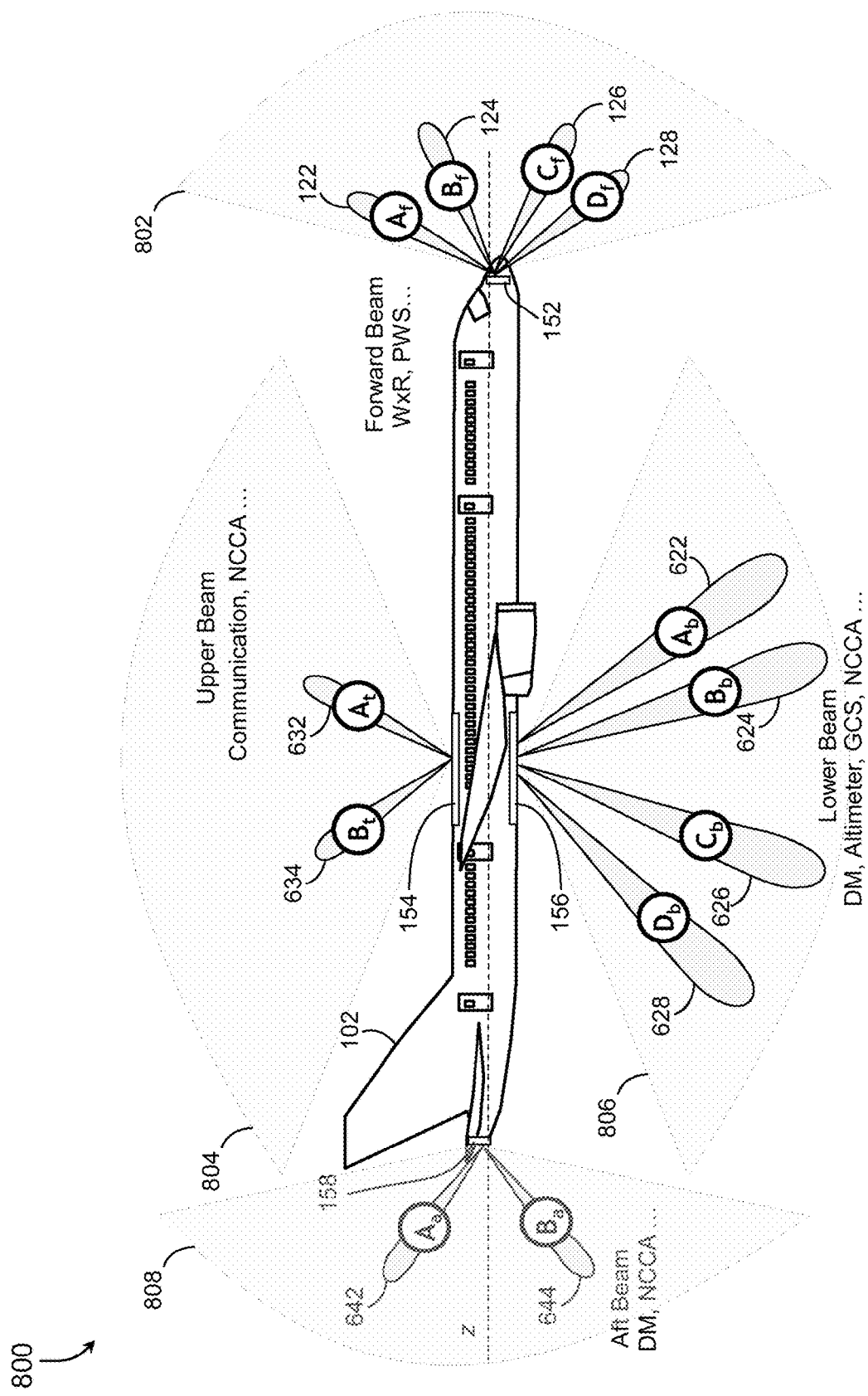
FIG. 8 is a diagram of a multiple panel multiple beam radar operation exemplary of one embodiment of the inventive concepts disclosed herein.

Referring now to FIG. 8, a diagram of a multiple panel multiple beam radar operation exemplary of one embodiment of the inventive concepts disclosed herein is shown. The multiple panel multiple beam operation 800 may provide a simultaneous, independently steered coherent multiple full or partial aperture beams for clarity in GCS for PWS, weather detection and other meteorological phenomenon.

In one embodiment, the controller 110 may employ three (or more) AESA 152-158 including the FWD 152, the top 154 and BTM 156 to achieve 240 degree (±152 degrees from the FWD boresight 412). Here, each of a FWD AESA coverage 802, a top AESA coverage 804, a BTM AESA coverage 806, and an aft AESA coverage 808 may provide one exemplary coverage about a vertical plane defined by the longitudinal and vertical axes. In addition, an overlap region of each coverage area may offer the controller 110 a multi-aperture capability within the overlap.

In one embodiment, the forward AESA 152, the top AESA 154, and the bottom AESA 156 may be configured for a vertical radar coverage of approximately 240 degrees centered on the boresight 412 of the aircraft.

In one embodiment, the controller 110 may function to provide GCS 114 since each panel maintains a different perspective with respect to a specific target (e.g. ground weather etc.). In function, each distal AESA may receive an individual estimate of a ground return vs a weather return and provide the controller 110 with a discernment between ground returns and actual weather returns.

For example, one configuration may employ a first AESA for GM 142 and a separate AESA for WxR 132. Here, a full panel of the BTM AESA 156 or a subarray thereof (e.g., beam $A_b$) may provide the controller 110 with with the dataset to suppress the ground clutter while the FWD AESA 152 and top AESA 154 may be fully or partially (at the subarray level) tasked with WxR 132. Here a strong signal from the ground returns compared to the relatively small return signals from the weather may enable to controller 110 to discern actual weather from the clutter.

In one embodiment, the controller 110 may distinguish ground clutter leveraging an angular characteristic of weather returns versus ground returns based on a reception direction at each of the individual AESA 152-158. For example, a reception direction at the horizon or above at the FWD AESA 152 may indicate a weather return while each reception of a return at the BTM AESA 156 may be a ground return. A weather return may maintain a vertical variance while the ground return may be fixed.

In addition, a weather return may possess a uniformity from one AESA to the adjacent AESA while a ground return may vary. As similar signal received at each AESA may lead the controller 110 to label the return as weather while angularly variable returns at adjacent AESA may lead the controller 110 to label those as ground.

In one embodiment, the multi-panel multi-function radar antenna system 100 may provide a spherical coverage about the aircraft. With employment of each of the FWD 152, top 154, BTM 156 and aft 158 AESA the controller 110 may command each AESA operational to maintain a 360-degree radar coverage about the vertical plane defined by the longitudinal and vertical axes. Similarly, the multi-panel multi-function radar antenna system 100 may include one or more side mounted AESA on the aircraft fuselage to enable the controller 110 to cover a 360-degree coverage area parallel to a horizontal plane defined by the longitudinal and lateral axes. Also, with the side mounted AESA in the equation, the controller 110 may enable a 360-degree coverage about a vertical plane defined by the lateral and vertical axes. In this manner, the multi-panel multi-function radar antenna system 100 may offer a spherical radar coverage with multiple AESA panels segmented into multiple beams for redundant and complete operation. Also, with multiple AESA, the multi-panel multi-function radar antenna system 100 may prevent a single point failure. With multiple panels, the overall system may inherently possess a multiple redundancy to enable continued operation with degradation of a single AESA 152. Here, the multi-panel multi-function radar antenna system 100 may enable a graceful failure per panel as well as graceful failure across panels.

In one embodiment, the all of the individual AESA may enable NCCA 138, the FWD AESA 152 may provide for WxR 132 and PWS 134, the top AESA 154 may enable satcom 630 as well as VWP 130, the BTM AESA 156 may enable GCS 114 and PWS 134, and the aft AESA 158 may enable directional alignment 146 and precision DF 150.

FIG. 9

Figure 9:
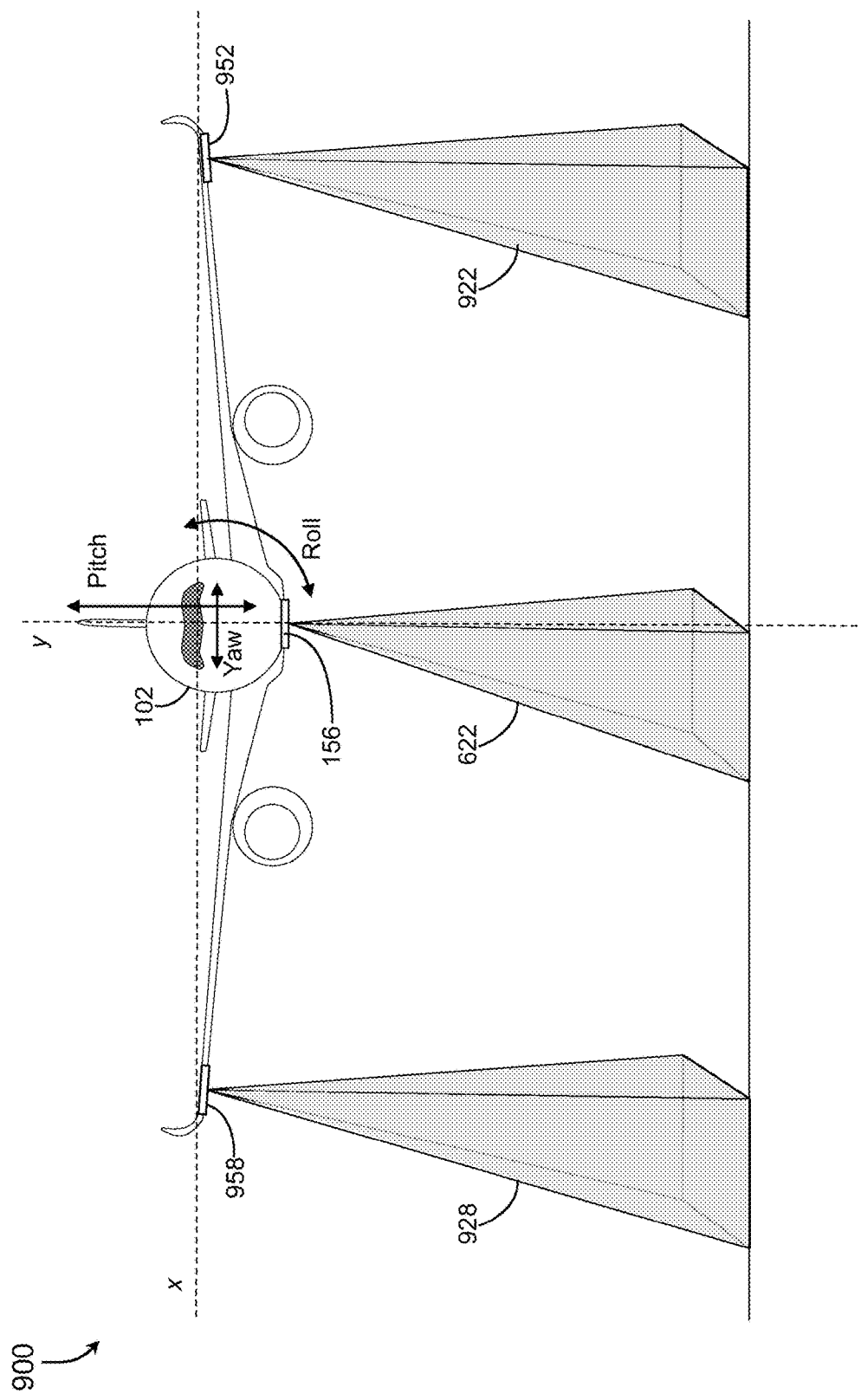
FIG. 9 is a graph of an aircraft directional alignment exemplary of one embodiment of the inventive concepts disclosed herein.

Referring now to FIG. 9, a graph of an aircraft directional alignment exemplary of one embodiment of the inventive concepts disclosed herein is shown. the directional alignment diagram 900 may display an ability of the multi-panel multi-function radar antenna system 100 for correcting a misaligned AESA panel due to a plurality of factors. As precise antenna beam positioning (e.g., within 0.1 degrees) may be a valuable factor in GCS and WxR, the multi-panel multi-function radar antenna system 100 may operate to correct for any errors in alignment.

In one embodiment, the controller 110 may align an individual AESA via a radar directional alignment system configured for receiving the second specific radar dataset from at least two of the plurality of individual AESA and determine a correction for a pitch misalignment and a roll misalignment of one of the plurality of individual AESA.

In one embodiment, some errors in alignment may be due to a root mean square (RMS) of errors during aircraft assembly which may be one significant source of AESA panel alignment error. In addition, each return signal may be affected by atmospheric refraction (e.g., humidity, ducting, etc.) or anomalous propagation of the radar return signal. Also, as air loads and pressure loads (e.g., fuselage pressure flex) may affect the aircraft structure during flight, the wings and fuselage may flex and bend causing additional errors in alignment.

Here, the controller 110 may perform ground measurements using multiple AESA panels spread across the aircraft to correct for each alignment error. For example, one configuration may employ the BTM AESA 156 as well as a left wingtip AESA 952 and a right wingtip AESA 958. The controller 110 may receive return signals from each AESA (left 922, right 928, and center 622) to correct for roll errors by comparing measurements from wingtip AESA 922 928 and correct for pitch errors by comparing measurements from all three AESA. Another configuration may include the FWD AESA 152 as one of the AESA for which the correction for pitch, roll, and yaw may be applicable.

In one embodiment, the controller 110 may function to calibrate each of the individual AESA 152-158 based on signals received from each as compared to the other. For example, the left wingtip AESA 922 may image a distinct ground feature while the right wingtip AESA 958 may receive only a partial image of the distinct ground feature. This difference may enable the controller 110 to calibrate each of the left and right AESA to see the same distinct feature.

In another embodiment, the controller 110 may receive inputs from three or more AESA and calibrate the fixed azimuth (look angle) of each AESA based on the received signals. With an aircraft state measurement as an additional input, the controller 110 may accurately determine a corrected boresight for each of the fixed AESA based on the received signals and aircraft attitude. Here, the controller 110 may calibrate without reference to the same ground feature since the uniformity of the ground return may enable the controller 110 to process the receive signals and determine an accurate boresight for each of the AESA.

In one embodiment, the multi-panel multi-function radar antenna system 100 may dynamically alter one or more functions of each AESA 152-158 based on aircraft attitude and nearby terrain. Here, the multi-panel multi-function radar antenna system 100 may enable the ability for the plurality of AESA panels 152-158 to not only be used spatially apart but also configured to adapt their mission/function based on how their relative positions around the aircraft change with movement and/or different surrounding terrain features. This may ensure each AESA panel 152-158 is performing the feature for which it is best suited given its position. For example, if the aircraft 102 is in a climb, the bottom AESA 156 normally positioned at the ground assisting in terrain mapping may now be able to image an area forward of the aircraft 102 where it could be performing low-lying weather and/or air traffic detection.

FIG. 10

Figure 10A:
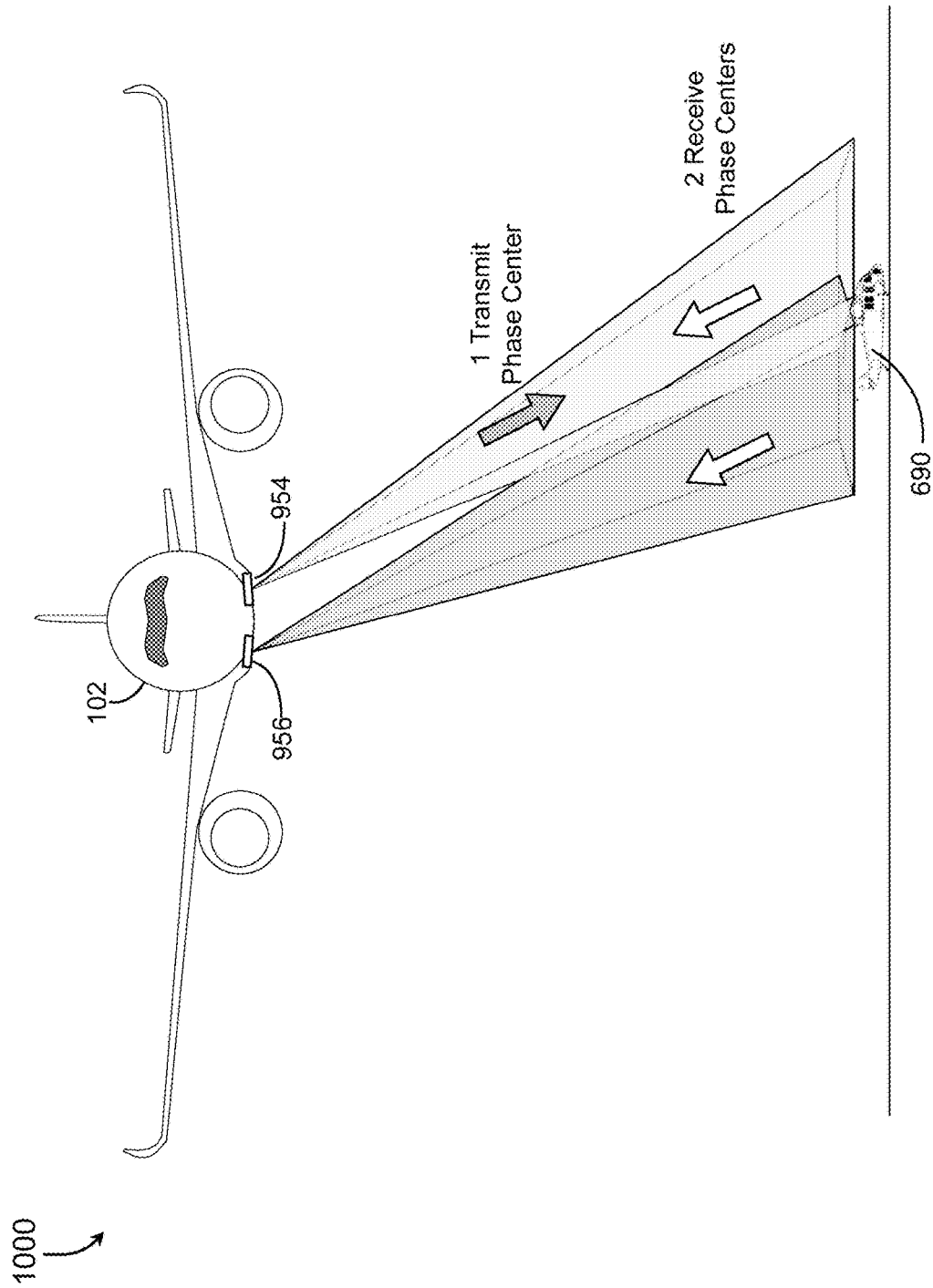
FIGS. 10A-10C are diagrams of a multi-static architecture associated with one embodiment of the inventive concepts disclosed herein.
Figure 10B:
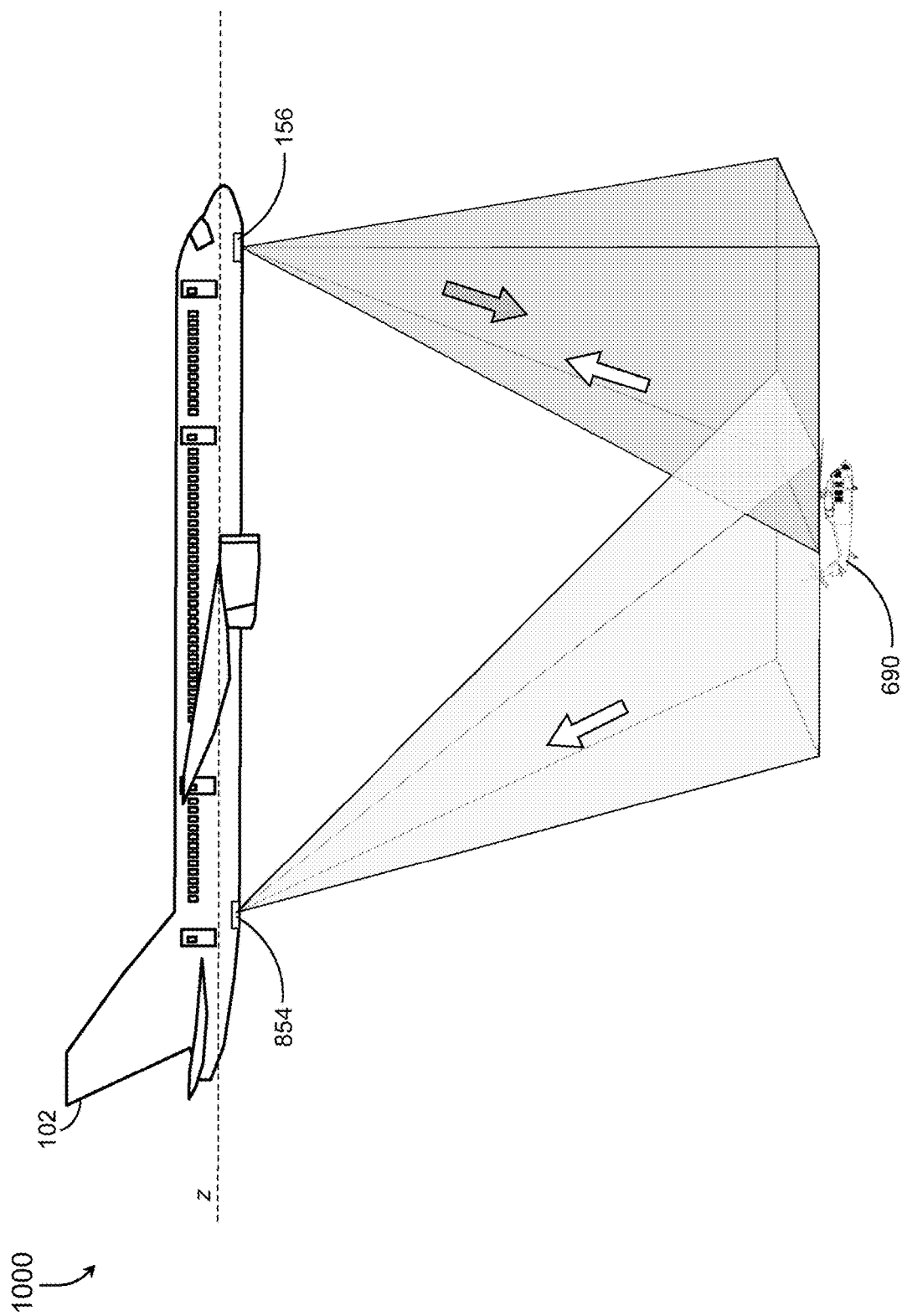
Figure 10C:
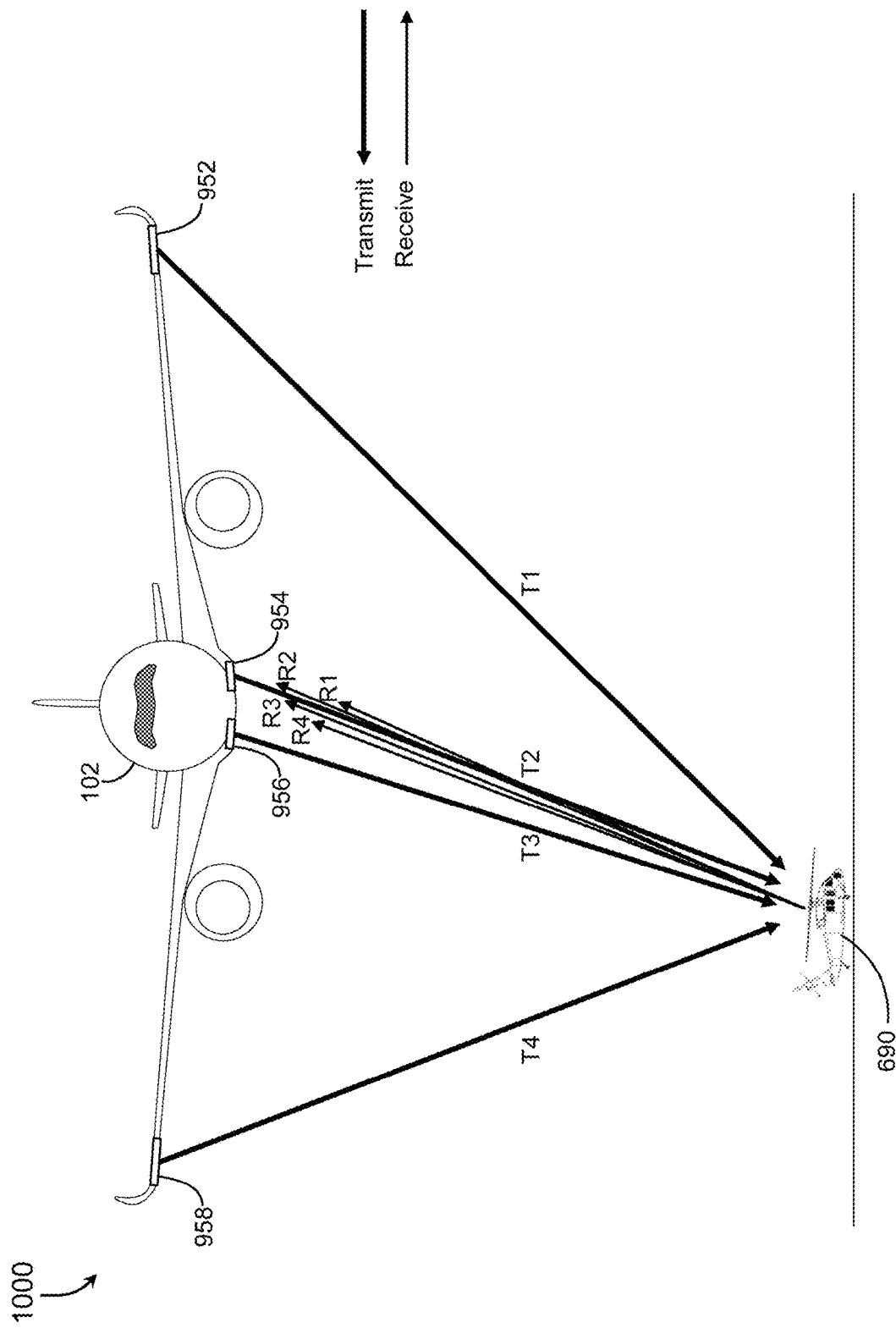

Referring now to FIGS. 10A-10C, diagrams of a multistatic architecture associated with one embodiment of the inventive concepts disclosed herein are shown. The multistatic architecture 1000 may enable the controller 110 to provide a synthetic aperture radar (SAR) using full aperture AESAs as well as partial aperture subarrays of the individual AESA 152-158. In one embodiment, the side looking SAR concepts may be directly adapted to forward looking SAR.

In one embodiment, the multi-panel multi-function radar antenna system 100 may enable a multi-static radar operation and a synthetic aperture radar function to command, via the second radar command, the specific radar dataset from two distal AESA of the plurality of individual AESA to receive a first aspect of a radar target 690 via a first AESA and a second aspect of the radar target 690 via a second distal AESA.

Within the memory 112, multiple radar Tx and Rx phase centers of each individual AESA 152-158 may be stored in the aircraft's coordinate and known a priori. The controller 110 may use the separation between the first and second AESA to determine additional detail about the passive target 690. Here, the controller 110 may employ a single transmit phase center and two receive phase centers to simultaneously view the multiple aspects of the passive target 690 enabling a high accuracy range resolution, accurate target classification and tracking, and focused SAR processing (e.g., high resolution with wide swath coverage).

In one embodiment, the multi-static architecture may enable a level of redundancy through continued operation with portions of one or more AESA inoperative. For example, a left fuselage AESA 954 and a distal right fuselage 956 AESA may offer the controller 110 separate aspects of the same radar passive target 690.

FIG. 10B may offer an additional example of the multistatic architecture 1000 using forward and aft BTM mounted AESA for the distally mounted AESA. Here, the BTM AESA 156 may be mounted near the aircraft nose while a second BTM aft AESA 854 may provide the separation between the two AESA for accurate SAR resolution and a more volumetric image of the target 690 or weather which may aid the controller 110 in discriminating one from the other.

Similarly, FIG. 10C may offer an example of a multiple input/multiple output (MIMO) architecture using wingtip mounted AESA. Here, the left wingtip AESA 952, the left fuselage AESA 954, right fuselage AESA 956, and the right wingtip AESA 958, may each transmit their respective signals (represented by the T1-T4), while the left fuselage AESA 954 may be designated as the receive AESA for receiving the return signals (R1-R4). In this manner, the controller 110 may command a MIMO radar via this system architecture enabling multi-dimensional processing, spatial resolution, clutter rejection, interference immunity, signal to noise resolution, desirable probability of detection, coherent process, and desired low target scintillation.

FIG. 11

Figure 11:
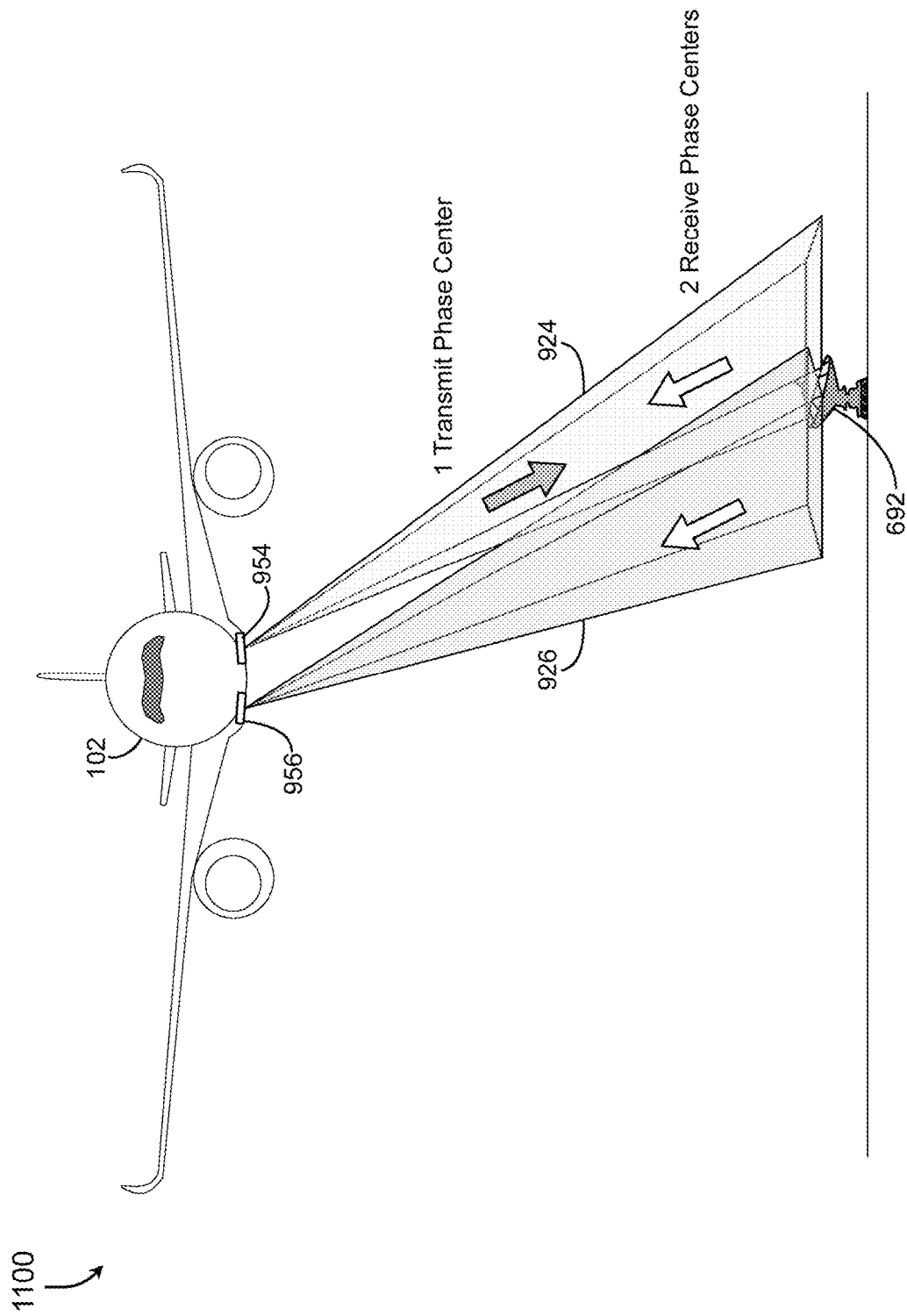
FIG. 11 is a diagram of a phase interferometry-based precision direction finding architecture in accordance with one embodiment of the inventive concepts disclosed herein.

Referring now to FIG. 11, a diagram of a phase interferometry-based precision direction finding architecture in accordance with one embodiment of the inventive concepts disclosed herein is shown. The precision DF 1100 architecture may enable the controller 110 to use either full or partial apertures of two or more of the plurality of individual AESA 152-158 for phase interferometry to accurately determine an active target 692 position. Here, the large physical size of the spread AESA may create a very narrow beamwidth.

In one embodiment, the precision DF 1100 architecture may enable a multi-panel AESA phase Interferometry direction finding system including, within the second radar command, at least two distal AESA of the plurality of individual AESA, a medium power, a large AESA segment size, a narrow beamwidth, a large elevation scan, and a high side lobe level relative to the main beam peak. The controller 110 may use the two or more AESA a phase interferometric analysis of a signal received by the two distal AESA to accurately determine a passive target 690 and an active target 692 position.

Another embodiment, may include the controller 110 determining extremely high accuracy angle of arrival for Signals of Interest (SIGINT) measurements. In this manner, the controller 110 may realize a very large synthetic aperture size and extremely small effective 3 dB beamwidth for precision angular resolution.

In one embodiment, the UAS may employ the precision DF architecture 1000 to enable the controller 110 to achieve precision DF/SIGINT, SAR, ground mapping, weather avoidance, and NCCA.

FIG. 12

Figure 12B:
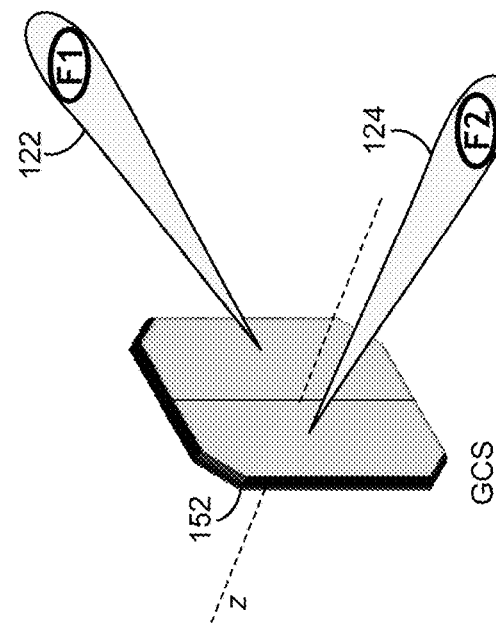
FIGS. 12A-12C are diagrams of multi-frequency segmented apertures associated with one embodiment of the inventive concepts disclosed herein.
Figure 12C:
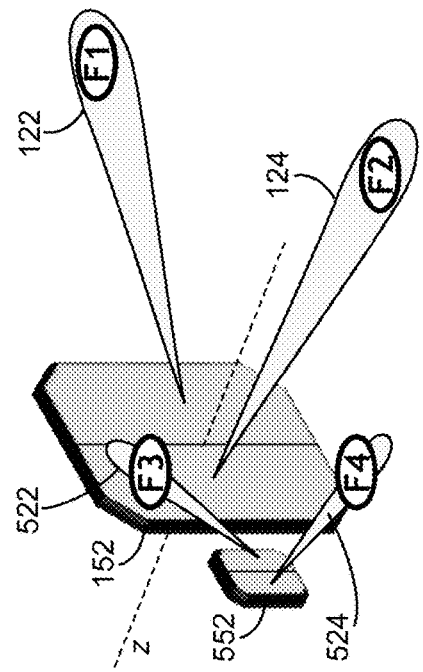
Figure 12A:
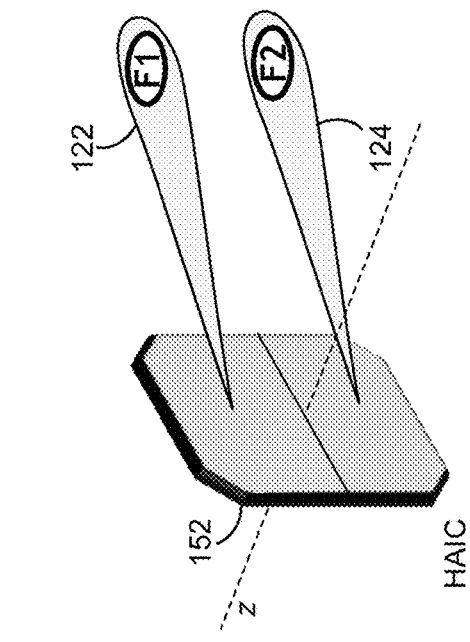

Referring now to FIGS. 12A through 12C, diagrams of multi-frequency segmented apertures associated with one embodiment of the inventive concepts disclosed herein are shown. A multi-frequency aperture 1200 may enable the controller 110 to image targets unable to accurately imaged limited to a single frequency. As a high frequency may enable accurate ground resolution, nearby pixels within the ground return may be quite different while nearby pixels in the weather return may be similar.

In one embodiment, the HAIC system 136 may benefit from the multiple frequency segmented aperture. Here, the second radar command may include the forward AESA and the top AESA, a high power, a medium AESA segment size, a first frequency from a first subarray and a second frequency from a second subarray, a narrow beamwidth, and a high side lobe level relative to the main beam peak.

For example, a frequency diversity may aid in GCS using an X band for a first beam and a W band for a second beam. Here, the controller 110 may visualize different types of patterns of the receive signal in terms of frequency and therefore accurately discern an ice or weather return from a ground return. Here, one employment may include a first AESA steered at the ground on a high frequency while a second AESA is steered near horizontal at the weather with a lower frequency. The controller 110 may use both images to distinguish the ground from the actual weather.

In addition, the multi-frequency aperture 1200 may enable the controller 110 to employ multiple frequencies and polarization states to tailor the desired beam for multiple radar cross section characteristics which may improve target discrimination (e.g., ice, water, drone, plane, runway mapping, etc.)

FIG. 12C may indicate and additional embodiment employing a second adjacent AESA panel 552 adjacent to one or more of the plurality of AESA 152-158. In this embodiment, a smaller size adjacent AESA 552 may remain with the footprint of a radome yet offer additional capability in use of an adjacent beam 3 522 and adjacent beam 4 524.

In one embodiment, a ⅓ size panel at 3× higher frequencies than the FWD AESA 152 the multi-panel multi-function radar antenna system 100 may utilize two different sizes of array adjacent to each other at their best size/cost/location over the performance. In one example, the FWD AESA 152 (F1 and F2) may operate within a range of 8-12 GHz while the adjacent AESA 552 (F3 and F4) may operate at an exemplary 24-36 GHz range.

FIG. 13

Figure 13:
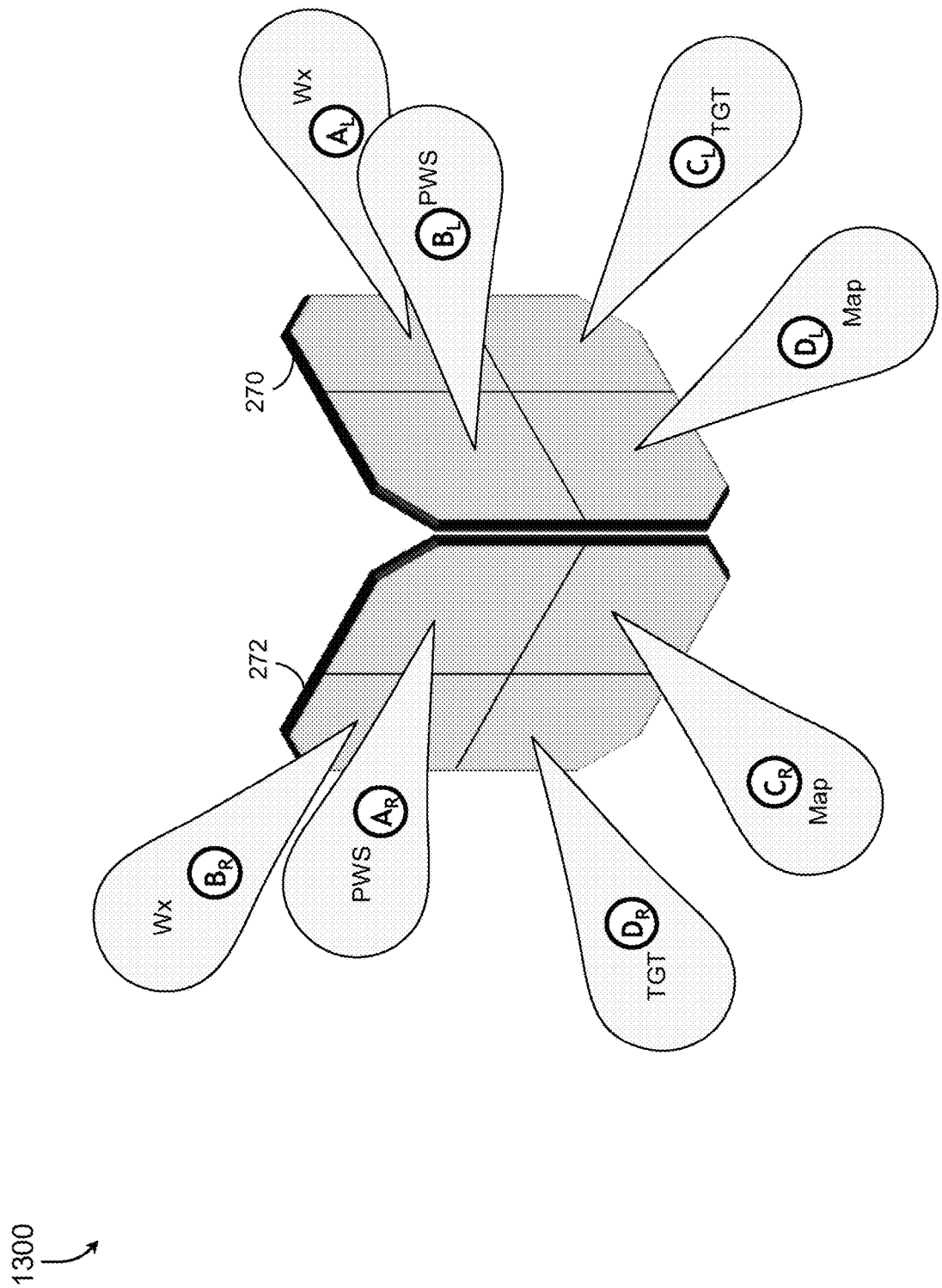
FIG. 13 is a diagram of a left and right forward chevron AESA of one embodiment of the inventive concepts disclosed herein.

Referring now to FIG. 13, a diagram of a left and right forward chevron AESA of one embodiment of the inventive concepts disclosed herein is shown. A chevron configuration 1300 including a left FWD AESA 270 and a right FWD AESA 272 may enable the controller 110 a great azimuthal scan forward of the aircraft 102. Due to aerodynamic considerations, some chevron configurations may be limited to physical placement onboard the aircraft 102. Some aircraft 102 may be limited to a forward chevron configuration while other aircraft may be fitted with a "half-bubble" radome addition to the aircraft external skin in any location within which the chevron may be sited.

In one embodiment, the chevron AESA configuration 1300 may also be segmented to enable the plurality of beams to accomplish multiple tasks. This configuration may enable simultaneous mode operations on several regions of interest (e.g., WxR, PWS, GM target tracking, etc.). In one embodiment, the controller 110 may command the exemplary eight subarrays shown here to all provide the same function (e.g. PWS on approach) offering a wide azimuth coverage to the overall multi-panel multi-function radar antenna system 100.

FIG. 14

Referring now to FIG. 14, a diagram of a method flow in accordance with one embodiment of the inventive concepts disclosed herein is shown. The method flow 1400 may include, at a step 1402, receiving a first radar command from a first system onboard an aircraft and a second radar command from a second system onboard the aircraft, the first system associated with a plurality of individual active electronically scanned array (AESA) each mounted at an individual fixed boresight onboard the aircraft, the first radar command includes a first aperture beam characteristic, a first azimuth, and a first elevation associated with a first aperture beam, the second radar command associated with the plurality of AESA and includes a second aperture beam characteristic, a second azimuth, and a second elevation associated with a second aperture beam.

The method may include at a step 1404 receiving an aircraft state data from an aircraft state data sensor and, at a step 1406, determining a radar function hierarchy based on the aircraft state data. The method 1400 may then include, at a step 1408, designating one or more of the plurality of individual AESA to carry out the first radar command and the second radar command based on the radar function hierarchy and the individual fixed azimuth and at a step 1410, in response to the first radar command and the second radar command, segmenting the designated AESA into at least two subarrays based on the radar function hierarchy of radar function, to transmit and receive the first aperture beam and the second aperture beam, the first aperture beam having the first aperture beam characteristic based on the first radar command and the second aperture beam having the second aperture beam characteristic based on the second radar command.

The method 1400 may include at a step 1412, transmitting and steering the first aperture beam based on the first radar command and the second aperture beam based on the second radar command from the designated AESA and, at a step 1414, receiving a first radar return from the first aperture beam and a second radar return from the second aperture beam.

The method 1400 may further include, at a step 1416, digitally combining the first radar return and the second radar return via a digital signal processing and creating a first specific radar dataset associated with the first system and a second specific radar dataset associated with the second system.

Once combined, the method may include, at a step 1418, supplying the first system with the first specific radar dataset associated with the first system and the second system with the second specific radar dataset associated with the second system; and at a step 1420, executing the system function of the first system based on the first specific radar dataset associated with the first system and the system function of the second system based on the second specific radar dataset associated with the second system.

CONCLUSION

As will be appreciated from the above description, embodiments of the inventive concepts disclosed herein may provide a novel solution to enable a plurality of fixed AESA to perform as individual full aperture arrays as well as segment into a plurality of subarrays enabling continuous GCS while simultaneous performing multiple additional functions.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A multi-panel multi-function radar antenna system, comprising:
   a plurality of individual active electronically scanned arrays (AESAs) mounted at a fixed azimuth onboard an aircraft, the plurality of individual AESAs including at least two of:
      a forward AESA having a forward fixed azimuth approximately parallel to a boresight of the aircraft;

a top AESA having a top fixed azimuth approximately parallel to a lift vector of the aircraft;

a bottom AESA having a bottom fixed azimuth approximately parallel to a weight vector of the aircraft; and an aft AESA having an aft fixed azimuth approximately parallel to a drag vector of the aircraft;

each of the plurality of individual AESAs configured for a segmented aperture enabling a first aperture beam having a first aperture beam characteristic, a first azimuth, and a first elevation, the segmented aperture also enabling at least one second aperture beam having a second aperture beam characteristic, a second azimuth, and a second elevation, each of the first aperture beam and the at least one second aperture beam being independently steered, coherent, and simultaneously radiated from one of the plurality of individual AESAs;

at least one aircraft system onboard the aircraft configured to 1) receive a specific radar dataset from one of of the plurality of individual AESAs and 2) perform a system function based on the specific radar dataset, the specific radar dataset provided by one of: the first aperture beam and the at least one second aperture beam;

a controller operatively coupled with the plurality of individual AESAs and the at least one aircraft system;

a tangible, non-transitory memory configured to communicate with the controller, the tangible, non-transitory memory having instructions stored therein that, in response to execution by the controller, cause the controller to:

receive a first radar command from a first system of the at least one aircraft system and a second radar command from at least one second system of the at least one aircraft system, the first radar command includes the first aperture beam characteristic, the first azimuth, and the first elevation, the second radar command includes the second aperture beam characteristic, the second azimuth, and the second elevation;

designate at least one of the plurality of individual AESAs to carry out the first radar command and the second radar command based on the fixed azimuth;

in response to the first radar command and the second radar command, segment the designated at least one AESA into at least two AESA subarrays, based on the first radar command and the second radar command, to transmit the first aperture beam and the at least one second aperture beam, the first aperture beam having the first aperture beam characteristic based on the first radar command and the at least one second aperture beam having the at least one second aperture beam characteristic based on the second radar command;

transmit and steer the first aperture beam based on the first radar command and the at least one second aperture beam based on the second radar command;

receive a first radar return from the first aperture beam and at least one second radar return from the at least one second aperture beam via at least one of the plurality of individual AESAs;

digitally combine the first radar return from the first aperture beam and the at least one second radar return from the at least one second aperture beam via a digital signal processing to create a first specific radar dataset associated with the first system and a second specific radar dataset associated with the at least one second system;

supply the first system with the first specific radar dataset associated with the first system and the at least one second system with the second specific radar dataset associated with the at least one second system; and execute the system function of the first system based on the first specific radar dataset associated with the first system and the system function of the at least one second system based on the second specific radar dataset associated with the at least one second system.

2. The multi-panel multi-function radar antenna system of claim 1, further including at least one aircraft state sensor configured to provide an aircraft state data and phase of flight to the controller, and wherein the controller is further configured to receive the aircraft state data and phase of flight and determine a radar function hierarchy based on the received aircraft state data and phase of flight.

3. The multi-panel multi-function radar antenna system of claim 2, wherein segment the designated at least one AESA into the at least two AESA subarrays, based on the first radar command and the second radar command is further based on the radar function hierarchy.

4. The multi-panel multi-function radar antenna system of claim 2, wherein the at least one aircraft state data includes one of an altitude, an airspeed, a climb configuration, a descent configuration, a cruise configuration, an approach configuration, a landing configuration, and a taxi configuration.

5. The multi-panel multi-function radar antenna system of claim 1, wherein the forward AESA, the top AESA, and the bottom AESA are configured for a vertical radar coverage of approximately 240 degrees centered on the boresight of the aircraft.

6. The multi-panel multi-function radar antenna system of claim 1, wherein the first radar command and the second radar command further comprise at least one of: the designated at least one AESA, an aperture beam power, an AESA segment size, a beamwidth, a polarization, an amplitude, a phase, an azimuth scan, an elevation scan, and a side lobe level relative to a main beam peak.

7. The multi-panel multi-function radar antenna system of claim 6, wherein the at least one second system further comprises a predictive windshear system and wherein the second radar command further comprises the forward AESA, the top AESA, and the bottom AESA.

8. The multi-panel multi-function radar antenna system of claim 6, wherein the at least one second system further comprises an icing detection system and wherein the second radar command further comprises at least one of the forward AESA and the top AESA, and a first frequency from a first subarray and a second frequency from a second subarray.

9. The multi-panel multi-function radar antenna system of claim 6, wherein the at least one second system further comprises a noncooperative collision avoidance system and wherein the second radar command further comprises at least one of the forward AESA, the top AESA, the bottom AESA, and the aft AESA.

10. The multi-panel multi-function radar antenna system of claim 6, wherein the at least one second system further comprises one of: a runway imaging system, a ground mapping system, and a geophysical obstacle clearance system, and wherein the second radar command further comprises at least one of the forward AESA, the bottom AESA, and the aft AESA.

11. The multi-panel multi-function radar antenna system of claim 1, wherein the at least one second system further comprises a radar directional alignment system configured for receiving the second specific radar dataset from at least two of the plurality of individual AESAs and determine a correction for one of a pitch misalignment and a roll misalignment of at least one of the plurality of individual AESAs.

12. The multi-panel multi-function radar antenna system of claim 1, wherein the at least one second system further comprises one of a multi-static radar operation and a synthetic aperture radar function wherein the second radar command further comprises the specific radar dataset from at least two distal AESAs of the plurality of individual AESAs to receive a first aspect of a radar target via a first AESA and a second aspect of the radar target via a second distal AESA.

13. The multi-panel multi-function radar antenna system of claim 1, wherein the at least one second system further comprises a multi-panel AESA phase interferometry direction finding system wherein the second radar command further comprises at least two distal AESAs of the plurality of individual AESAs, and wherein the controller is further configured to determine a passive target position and an active target position based on a phase interferometric analysis of a signal received by the at least two distal AESAs.

14. The multi-panel multi-function radar antenna system of claim 1, wherein the second radar command further includes each of an amplitude control and a phase control to enable a radiation pattern synthesis between the at least two subarrays, and wherein executing the system function of the at least one second system is based on the radiation pattern synthesis.

15. A method for multi-panel multi-function radar operation, comprising:
receiving a first radar command from a first system onboard an aircraft, the first system associated with a plurality of individual active electronically scanned arrays (AESAs) each mounted at an individual fixed azimuth onboard the aircraft, the first radar command includes a first aperture beam characteristic, a first azimuth, and a first elevation associated with a first aperture beam;
receiving a second radar command from at least one second system onboard the aircraft, the second radar command associated with the plurality of individual AESAs and includes a second aperture beam characteristic, a second azimuth, and a second elevation associated with at least one second aperture beam;
receiving an aircraft state data from at least one aircraft state data sensor;
determining a radar function hierarchy based on the aircraft state data;
designating at least one of the plurality of individual AESAs to carry out the first radar command and the second radar command based on the radar function hierarchy and the individual fixed azimuth;
in response to the first radar command and the second radar command, segmenting the designated at least one AESA into at least two subarrays based on the radar function hierarchy of radar function, to transmit and receive the first aperture beam and the at least one second aperture beam, the first aperture beam having the first aperture beam characteristic based on the first radar command and the at least one second aperture beam having the second aperture beam characteristic based on the second radar command;
transmitting and steering the first aperture beam based on the first radar command and the at least one second aperture beam based on the second radar command from the designated at least one AESA;
receiving a first radar return from the first aperture beam and at least one second radar return from the at least one second aperture beam;
digitally combining the first radar return and the at least one second radar return via a digital signal processing and creating a first specific radar dataset associated with the first system and a second specific radar dataset associated with the at least one second system;
supplying the first system with the first specific radar dataset associated with the first system and the at least one second system with the second specific radar dataset associated with the at least one second system; and
executing a system function of the first system based on the first specific radar dataset associated with the first system and the system function of the at least one second system based on the second specific radar dataset associated with the at least one second system.

* * * * *